US011576212B2

(12) United States Patent
Agiwal et al.

(10) Patent No.: US 11,576,212 B2
(45) Date of Patent: Feb. 7, 2023

(54) METHOD AND APPARATUS FOR HANDLING SWITCHING BETWEEN 2-STEP AND 4-STEP RANDOM ACCESS

(71) Applicant: Samsung Electronics Co., Ltd., Suwon-si (KR)

(72) Inventors: Anil Agiwal, Suwon-si (KR); Jaehyuk Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/123,565

(22) Filed: Dec. 16, 2020

(65) Prior Publication Data

US 2021/0185733 A1 Jun. 17, 2021

Related U.S. Application Data

(60) Provisional application No. 62/948,362, filed on Dec. 16, 2019.

(51) Int. Cl.
*H04W 4/00* (2018.01)
*H04W 74/08* (2009.01)
(Continued)

(52) U.S. Cl.
CPC ..... *H04W 74/0833* (2013.01); *H04W 72/042* (2013.01); *H04W 72/0453* (2013.01);
(Continued)

(58) Field of Classification Search
CPC . H04W 74/0833; H04W 76/11; H04W 76/27; H04W 72/042; H04W 72/0453; H04W 74/02
See application file for complete search history.

(56) References Cited

U.S. PATENT DOCUMENTS

2018/0103465 A1 4/2018 Agiwal et al.
2018/0110074 A1 4/2018 Akkarakaran et al.
(Continued)

FOREIGN PATENT DOCUMENTS

EP 3 508 020 7/2019

OTHER PUBLICATIONS

Ericsson, 'Configuration of 2-step RA',R2-1912680, 3GPP TSG RAN WG2 RAN2#107bis,Chongqing, China, section 2.1; and figure 1, Oct. 3, 2019.
(Continued)

*Primary Examiner* — Siren Wei
(74) *Attorney, Agent, or Firm* — Jefferson IP Law, LLP

(57) ABSTRACT

A communication method and system for converging a 5th generation (5G) communication system for supporting higher data rates beyond a 4th generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method, terminal, and base station for performing a random access procedure in a wireless communication system are provided. The terminal method includes, receiving, from a base station, a radio resource control (RRC) reconfiguration message including dedicated configuration information for an RA, identifying whether information on a maximum number for message A (MSGA) transmissions is configured in the dedicated configuration information, and in case that the information on the maximum number is configured in the dedicated configuration information, performing the RA procedure based on the information on the maximum number.

15 Claims, 14 Drawing Sheets

(51) Int. Cl.
  *H04W 76/27* (2018.01)
  *H04W 76/11* (2018.01)
  *H04W 72/04* (2009.01)
  *H04W 74/02* (2009.01)
(52) U.S. Cl.
  CPC ............ *H04W 74/02* (2013.01); *H04W 76/11* (2018.02); *H04W 76/27* (2018.02)

(56) References Cited

U.S. PATENT DOCUMENTS

| | | | | |
|---|---|---|---|---|
| 2020/0045745 | A1* | 2/2020 | Cirik | H04B 7/0695 |
| 2020/0245369 | A1* | 7/2020 | Chen | H04W 48/16 |
| 2020/0314917 | A1* | 10/2020 | Jeon | H04W 74/08 |
| 2021/0378027 | A1* | 12/2021 | Wang | H04W 68/005 |
| 2021/0385867 | A1* | 12/2021 | Futaki | H04W 74/0833 |

OTHER PUBLICATIONS

NTT Docomo, Inc., 'Discussion on Channel Structure for Two-Step RACH', R1-1912869, 3GPP TSG RAN WG1 #99, Reno, USA, section 2.3, Nov. 8, 2019.

Vivo, 'Discussion on the 2-step CFRA', R2-1912191, 3GPP TSG RAN WG2 Meeting #107bis, Chongqing, China, sections 1, 2.3; and figure , Oct. 4, 2019.

Panasonic, Loading Control in the RACH Type Selection, R2-1915450, 3GPP TSG RAN WG2, Meeting#108, Reno, USA, section 2.1, Nov. 17, 2019.

International Search Report and written opinion dated Apr. 7, 2021, issued in International Application No. PCT/KR2020/018482.

Ericsson: "Report on email [107bis#77] [2-step RACH] RRC details and running RRC", 3GPP Draft; R2-1915787, Reno, Nevdada US, Nov. 18-22, 2019.

Ericsson: "2-step RA 38.331 Running CR", 3GPP Draft; R2-1915786, 3GPP TSG-RAN WG2 #108, Reno, Nevdada US, Nov. 18-22, 2019.

Huawei et al: "Discussion on supported triggers and scenarios for 2-step RACH", 3GPP Draft; R2-1904108, 3GPP TSG-RAN WG2 Meeting#105bis, Xi'an China, Apr. 8-12, 2019.

Extended European Search Report dated Nov. 9, 2021, issued in European Application No. 20875654.4.

Indian Office Action dated Nov. 24, 2022, issued in Indian Application No. 202137021516.

* cited by examiner

METHOD AND APPARATUS FOR HANDLING SWITCHING BETWEEN 2-STEP AND 4-STEP RANDOM ACCESS

CROSS-REFERENCE TO RELATED APPLICATION(S)

This application is based on and claims priority under 35 U.S.C. § 119(e) of a U.S. Provisional application Ser. No. 62/948,362, filed on Dec. 16, 2019, in the U.S. Patent and Trademark Office, the disclosure of which is incorporated by reference herein in its entirety.

BACKGROUND

1. Field

The disclosure relates to a system and a method for handling switching between 2-step and 4-step random access. More particularly, the disclosure relates to a communication method, terminal, and base station terminal for performing a random access (RA) procedure in a wireless communication system.

2. Description of Related Art

To meet the demand for wireless data traffic which has increased since deployment of 4th generation (4G) communication systems, efforts have been made to develop an improved 5th generation (5G) or pre-5G communication system. Therefore, the 5G or pre-5G communication system is also referred to as a 'beyond 4G network' or a 'post long term evolution (LTE) System.' The 5G wireless communication system supports not only lower frequency bands but also higher frequency (millimeter (mm) Wave) bands, e.g., 10 gigahertz (GHz) to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to an internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. The third generation (3G) wireless communication system supports the voice service and data service. The 4G wireless communication system has been developed to provide high-speed data service. However, the 4G wireless communication system currently suffers from a lack of resources to meet the growing demand for high speed data services. Therefore, the 5G wireless communication system (also referred as next generation radio or new radio (NR)) is being developed to meet the growing demand of various services with diverse requirements, e.g., high-speed data services, support ultra-reliability and low-latency applications.

In addition, the 5G wireless communication system is expected to address different use cases having different requirements in terms of data rate, latency, reliability, mobility etc. However, it is expected that the design of the air-interface of the 5G wireless communication system will be flexible enough to serve user equipments (UEs) having different capabilities depending on the use case and market segment in which a UE caters service to the end customer. Use cases the 5G wireless communication system is expected to address include enhanced mobile Broadband (eMBB), massive machine type communication (m-MTC), ultra-reliable low-latency communication (URLL), etc. The eMBB requirements (e.g., tens of gigabits per second (Gbps) data rate, low-latency, high-mobility, and so on) address the market segment representing the wireless broadband subscribers needing internet connectivity everywhere, all the time and on the go. The m-MTC requirements (e.g., very high connection density, infrequent data transmission, very long battery life, low mobility address, and so on) address the market segment representing the IoT/IoE envisioning connectivity of billions of devices. The URLL requirements (e.g., very low latency, very high reliability, variable mobility, and so forth) address the market segment representing the Industrial automation application and vehicle-to-vehicle/vehicle-to-infrastructure communication that is foreseen as one of the enablers for autonomous cars.

In the 5G wireless communication system operating in higher frequency (mmWave) bands, the UE and next generation node B (gNB) communicate with each other using beamforming Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on an RX signal by using an RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of TX beam patterns of different directions. Each of these TX beam patterns can be also referred as a TX beam. A wireless communication system operating at high frequency uses a plurality of narrow TX beams to transmit signals in the cell as each narrow TX beam provides coverage to a part of cell. The narrower the TX beam, the higher the antenna gain and hence the larger the propagation distance of a signal transmitted using beamforming A receiver can also make a plurality of RX beam patterns of different directions. Each of these RX beam patterns can be also referred as an RX beam.

The 5G wireless communication system supports a stand-alone mode of operation as well as dual connectivity (DC). In DC, a multiple RX/TX UE may be configured to utilize resources provided by two different nodes (or node Bs (NBs)) connected via a non-ideal backhaul. One node acts as a master node (MN) and the other node acts as a secondary node (SN). The MN and SN are connected via a network interface and at least the MN is connected to the core network. NR also supports multi-radio access technology (RAT) DC (MR-DC) operation whereby a UE in radio resource control (RRC) CONNECTED is configured to utilize radio resources provided by two distinct schedulers, located in two different nodes connected via a non-ideal backhaul and providing either evolved universal mobile telecommunications system (UMTS) terrestrial radio access (E-UTRA) (i.e., if the node is an evolved node B (eNB)) or NR access (i.e., if the node is a gNB).

In NR, for a UE in RRC CONNECTED not configured with carrier aggregation (CA)/DC, there is only one serving cell, comprising the primary cell (PCell). For a UE in RRC CONNECTED configured with CA/DC, the term 'serving cells' is used to denote the set of cells comprising the special cell(s) (SpCell(s)) and all secondary cells (SCells).

In NR, the term 'master cell group (MCG)' refers to a group of serving cells associated with the MN, comprising of the PCell and optionally one or more SCells. In NR, the term 'secondary cell group (SCG)' refers to a group of serving cells associated with the SN, comprising the primary SCG cell (PSCell) and optionally one or more SCells. In NR, PCell refers to a serving cell in MCG, operating on the primary frequency, in which the UE either performs the initial connection establishment procedure or initiates the connection re-establishment procedure. In NR, for a UE configured with CA, SCell is a cell providing additional radio resources on top of SpCell. PSCell refers to a serving cell in SCG in which the UE performs random access (RA) when performing the reconfiguration with synchronization procedure. For DC operation, the term 'SpCell' refers to the PCell of the MCG or the PSCell of the SCG, otherwise the term SpCell refers to the PCell.

In the 5G wireless communication system, a node B (gNB) or base station in cell broadcast synchronization signal and physical broadcast channel (PBCH) block (SSB) consists of primary and secondary synchronization signals (PSS, SSS) and system information (SI). SI includes common parameters needed to communicate in cell. In the 5G wireless communication system (also referred to as NR), SI is divided into the master information block (MIB) and a number of SI blocks (SIBs) where:

the MIB is always transmitted on the PBCH with a periodicity of 80 ms and repetitions made within 80 ms, and it includes parameters that are needed to acquire SIB1 from the cell;

the SIB1 is transmitted on the downlink shared channel (DL-SCH) with a periodicity of 160 ms and variable transmission repetition. The default transmission repetition periodicity of SIB1 is 20 ms, but the actual transmission repetition periodicity is up to network implementation. SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. SIB1 is cell-specific SIB; and SIBs other than SIB1 are carried in SI messages, which are transmitted on the DL-SCH. Only SIBs having the same periodicity can be mapped to the same SI message.

In the 5G wireless communication system, physical downlink control channel (PDCCH) is used to schedule DL transmissions on physical downlink shared channel (PDSCH) and uplink (UL) transmissions on physical uplink shared channel (PUSCH), where the downlink control information (DCI) on PDCCH includes: downlink assignments containing at least modulation and coding format, resource allocation, and hybrid-automatic repeat request (HARQ) information related to DL-SCH; UL scheduling grants containing at least modulation and coding format, resource allocation, and HARQ information related to UL-SCH. In addition to scheduling, PDCCH can be used for activation and deactivation of configured PUSCH transmission with configured grant, activation and deactivation of PDSCH semi-persistent transmission, notifying one or more UEs of the slot format, notifying one or more UEs of the physical resource block(s) (PRBs) and orthogonal frequency division multiplexing (OFDM) symbol(s) where the UE may assume no transmission is intended for the UE, transmission of transmission power control (TPC) commands for PUCCH and PUSCH, transmission of one or more TPC commands for sounding reference signal (SRS) transmissions by one or more UEs, switching a UE's active bandwidth part (BWP), or initiating an RA procedure. A UE monitors a set of PDCCH candidates in the configured monitoring occasions in one or more configured control resource sets (CORE- SETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE consisting a set of REGs. Control channels are formed by aggregation of CCEs. Different code rates for the control channels are realized by aggregating different numbers of CCEs. Interleaved and non-interleaved CCE-to-REG mapping are supported in a CORESET. Polar coding is used for PDCCH. Each REG carrying PDCCH carries its own demodulation reference signal (DMRS). Quadrature phase shift keying (QPSK) modulation is used for PDCCH.

In the 5G wireless communication system, a list of search space configurations is signaled by a gNB for each configured BWP, wherein each search configuration is uniquely identified by an identifier (ID). An ID of a search space configuration to be used for specific purpose such as paging reception, SI reception, and random access response (RAR) reception is explicitly signaled by the gNB. In NR, a search space configuration comprises parameters Monitoring-periodicity-PDCCH-slot, Monitoring-offset-PDCCH-slot, Monitoring-symbols-PDCCH-within-slot, and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration, where the slot with number 'x' in a radio frame with number 'y' satisfies the following equation:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the CORESET associated with the search space. Search space configuration includes the ID of CORESET configuration associated with it. A list of CORESET configurations is signaled by a gNB for each configured BWP, wherein each CORESET configuration is uniquely identified by an ID. Note that each radio frame is of 10 ms duration. A radio frame is identified by a radio frame number or system frame number. Each radio frame comprises several slots, wherein the number of slots in a radio frame and duration of slots depend on subcarrier spacing (SCS). The number of slots in a radio frame and duration of slots depending on radio frame for each supported SCS are pre-defined in NR. Each CORESET configuration is associated with a list of transmission configuration indicator (TCI) states. One DL reference signal (RS) ID (SSB or channel state information (CSI)-RS) is configured per TCI state. The list of TCI states corresponding to a CORESET configuration is signaled by a gNB via RRC signaling. One of the TCI states in a TCI state list is activated and indicated to the UE by the gNB. The TCI state indicates the DL Tx beam (DL Tx beam is quasi co-located (QCLed) with SSB/CSI-RS of TCI state) used by the gNB for transmission of PDCCH in the PDCCH monitoring occasions of a search space.

In the 5G wireless communication system, bandwidth adaptation (BA) is supported. With BA, the receive and transmit bandwidth of a UE need not be as large as the bandwidth of the cell and can be adjusted, the width can be ordered to change (e.g., to shrink during a period of low activity to save power), the location can move in the frequency domain (e.g., to increase scheduling flexibility), and the SCS can be ordered to change (e.g., to allow different services). A subset of the total cell bandwidth of a cell is referred to as a BWP. BA is achieved by configuring an RRC connected UE with BWP(s) and informing the UE of which of the configured BWPs is currently the active one. When BA is configured, the UE only has to monitor PDCCH on the one active BWP, i.e., it does not have to monitor PDCCH on the entire DL frequency of the serving cell. In an RRC connected state, the UE is configured with one or more DL and UL BWPs, for each configured serving cell (i.e., PCell or SCell). For an activated serving cell, there is always one active UL and DL BWP at any point in time. The BWP switching for a serving cell is used to activate an inactive BWP and deactivate an active BWP at a time. The BWP switching is controlled by the PDCCH indicating a DL assignment or a UL grant, by the bwp-InactivityTimer, by RRC signaling, or by the media access control (MAC) entity itself upon initiation of an RA procedure. Upon addition of an SpCell or activation of an SCell, the DL BWP and UL BWP indicated by firstActiveDownlinkBWP-Id and firstActiveUplinkBWP-Id respectively are active without receiving a PDCCH indicating a DL assignment or a UL grant. The active BWP for a serving cell is indicated by either RRC or PDCCH. For unpaired spectrum, a DL BWP is paired with a UL BWP, and BWP switching is common for both UL and DL. Upon expiration of a BWP inactivity timer, the UE switches the active DL BWP to the default DL BWP or an initial DL BWP (if the default DL BWP is not configured).

In the 5G wireless communication system, RA is supported. RA is used to achieve UL time synchronization. RA is used during initial access, handover, RRC connection re-establishment procedures, scheduling request transmissions, SCG addition/modification, beam failure recovery, and data or control information transmission in UL by a non-synchronized UE in an RRC CONNECTED state. Several types of RA procedures are supported.

Contention based RA (CBRA): This is also referred as 4-step CBRA. In this type of RA, the UE first transmits an RA preamble (also referred as message 1 (Msg1)), and then waits for an RAR in the RAR window. The RAR is also referred as message 2 (Msg2). A gNB transmits the RAR on the PDSCH. A PDCCH scheduling the PDSCH carrying the RAR is addressed to an RA-radio network temporary identifier (RA-RNTI). The RA-RNTI identifies the time-frequency resource (also referred as a physical RA channel (PRACH) occasion or a PRACH TX occasion or an RA channel (RACH) occasion (RO)) in which the RA preamble was detected by the gNB. The RA-RNTI is calculated as follows:

$$\text{RA-RNTI}=1+s\_id+14*t\_id+14*80*f\_id+14*80*8*ul\_\text{carrier\_id}$$

where s_id is the index of the first OFDM symbol of the PRACH occasion, where the UE has transmitted Msg1, i.e., the RA preamble; 0≤s_id<14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various RA preambles detected by the gNB can be multiplexed in the same RAR MAC protocol data unit (PDU) by the gNB. An RAR in a MAC PDU corresponds to a UE's RA preamble transmission if the RAR includes an RA preamble identifier (RAPID) of the RA preamble transmitted by the UE. If the RAR corresponding to its RA preamble transmission is not received during the RAR window and the UE has not yet transmitted the RA preamble for a configurable (e.g., configured by the gNB in a RACH configuration) number of times, the UE returns to the first step, i.e., selects an RA resource (preamble/RO) and transmits the RA preamble. A backoff may be applied before returning to the first step.

If the RAR corresponding to the RA preamble transmission is received, the UE transmits a message 3 (Msg3) in a UL grant received in RAR. Msg3 includes messages such as an RRC connection request, an RRC connection re-establishment request, an RRC handover confirm, a scheduling request, an SI request, etc. Msg3 may include the UE identity (i.e., a cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a PDCCH addressed to the C-RNTI included in Msg3, contention resolution is considered successful, a contention resolution timer is stopped, and the RA procedure is completed. While the contention resolution timer is running, if the UE receives a contention resolution MAC control element (CE) including the UE's contention resolution identity (e.g., the first X bits of a common control channel (CCCH) service data unit (SDU) transmitted in Msg3), contention resolution is considered successful, the contention resolution timer is stopped, and the RA procedure is completed. If the contention resolution timer expires and the UE has not yet transmitted the RA preamble for a configurable number of times, the UE returns to the first step, i.e., selects an RA resource (preamble/RO) and transmits the RA preamble. A backoff may be applied before returning to the first step.

Contention free RA (CFRA): This is also referred as legacy CFRA or 4-step CFRA. A CFRA procedure is used for scenarios such as handover where low latency is required, timing advance establishment for Scell, etc. An eNB (or gNB) assigns to the UE a dedicated RA preamble. The UE transmits the dedicated RA preamble. The eNB (or gNB) transmits the RAR on a PDSCH addressed to RA-RNTI. The RAR conveys an RA preamble identifier and timing alignment information. The RAR may also include a UL grant. The RAR is transmitted in an RAR window similar to a CBRA procedure. CFRA is considered successfully completed after receiving the RAR including an RAPID of the RA preamble transmitted by the UE. In case RA is initiated for beam failure recovery, CFRA is considered successfully completed if PDCCH addressed to C-RNTI is received in a search space for beam failure recovery. If the RAR window expires and RA is not successfully completed and the UE has not yet transmitted the RA preamble for a configurable (i.e., configured by the gNB in a RACH configuration) number of times, the UE retransmits the RA preamble.

For certain events such has handover and beam failure recovery, if dedicated preamble(s) are assigned to the UE, during the first step of RA, i.e., during RA resource selection for Msg1 transmission, the UE determines whether to transmit the dedicated preamble or a non-dedicated preamble. Dedicated preambles are typically provided for a subset of SSBs/CSI-RSs. If there is no SSB/CSI-RS having DL reference signal received power (RSRP) above a threshold among the SSBs/CSI-RSs for which CFRA resources (i.e., dedicated preambles/ROs) are provided by the gNB, the UE selects a non-dedicated preamble. Otherwise, the UE selects the dedicated preamble. During the RA procedure, one RA attempt may be CFRA while another RA attempt may be CBRA.

2-step CBRA: In the first step, the UE transmits an RA preamble on a PRACH and a payload (i.e., MAC PDU) on a PUSCH. The RA preamble and payload transmission is also referred as message A (MSGA). In the second step, after MSGA transmission, the UE monitors for a response from the network (i.e., from the gNB) within a configured window. The response is also referred as message B (MSGB). If a CCCH SDU was transmitted in the MSGA payload, the UE performs contention resolution using the contention resolution information in MSGB. The contention resolution is successful if the contention resolution identity received in MSGB matches the first 48 bits of the CCCH SDU transmitted in MSGA. If a C-RNTI was transmitted in the MSGA payload, the contention resolution is successful if the UE receives a PDCCH addressed to the C-RNTI. If contention resolution is successful, the RA procedure is considered successfully completed. Instead of contention resolution information corresponding to the transmitted MSGA, MSGB may include fallback information corresponding to the RA preamble transmitted in MSGA. If the fallback information is received, the UE transmits Msg3 and performs contention resolution using Msg4 as in the CBRA procedure. If contention resolution is successful, the RA procedure is considered successfully completed. If contention resolution fails upon fallback (i.e., upon transmitting Msg3), the UE retransmits MSGA. If a configured window in which the UE monitors a network response after transmitting MSGA expires and the UE has not received MSGB including contention resolution information or fallback information as explained above, the UE retransmits MSGA. If the RA procedure is not successfully completed after transmitting MSGA a configurable number of times, the UE fallbacks to the 4-step RA procedure, i.e., the UE only transmits the RA preamble.

An MSGA payload may include one or more of CCCH SDU, a dedicated control channel (DCCH) SDU, a dedicated traffic channel (DTCH) SDU, a buffer status report (BSR) MAC CE, a power headroom report (PHR) MAC CE, SSB information, a C-RNTI MAC CE, or padding. MSGA may include a UE ID (e.g., random ID, S-TMSI, C-RNTI, resume ID, etc.) along with a preamble in the first step. The UE ID may be included in the MAC PDU of MSGA. A UE ID such as C-RNTI may be carried in a MAC CE, wherein the MAC CE is included in a MAC PDU. Other UE IDs (such as random ID, S-TMSI, C-RNTI, resume ID, etc.) may be carried in CCCH SDU. The UE ID can be one of random ID, S-TMSI, C-RNTI, resume ID, international mobile subscriber identity (IMSI), idle mode ID, inactive mode ID, etc. The UE ID can be different in different scenarios in which UE performs the RA procedure. When the UE performs RA after power on (before it is attached to the network), then the UE ID is the random ID. When the UE performs RA in an IDLE state after the UE is attached to network, the UE ID is S-TMSI. If the UE has an assigned C-RNTI (e.g., in a connected state), the UE ID is C-RNTI. In case the UE is in an INACTIVE state, the UE ID is resume ID. In addition to the UE ID, some additional control information can be sent in MSGA. The control information may be included in the MAC PDU of the MSGA. The control information may include one or more of a connection request indication, a connection resume request indication, an SI request indication, a buffer status indication, beam information (e.g., one or more DL TX beam ID(s) or SSB ID(s)), beam failure recovery indication/information, a data indicator, a cell/base station (BS)/transmit-receive point (TRP) switching indication, a connection re-establishment indication, a reconfiguration complete or handover complete message, etc.

2-step CFRA: In this case, the gNB assigns to the UE a dedicated RA preamble(s) and PUSCH resource(s) for MSGA transmission. RO(s) to be used for preamble transmission may also be indicated. In the first step, the UE transmits the RA preamble on a PRACH and a payload on a PUSCH using the CFRA resources (i.e., a dedicated preamble/PUSCH resource/RO). In the second step, after MSGA transmission, the UE monitors for a response from the network (i.e., the gNB) within a configured window. If the UE receives a PDCCH addressed to the C-RNTI, the RA procedure is considered successfully completed. If the UE receives fallback information corresponding to the transmitted preamble, the RA procedure is considered successfully completed.

For certain events such as handover and beam failure recovery, if a dedicated preamble(s) and PUSCH resource(s) are assigned to the UE, during the first step of RA, i.e., during RA resource selection for MSGA transmission, the UE determines whether to transmit the dedicated preamble or a non-dedicated preamble. Dedicated preambles are typically provided for a subset of SSBs/CSI-RSs. If there is no SSB/CSI-RS having a DL RSRP above a threshold among the SSBs/CSI-RSs for which CFRA resources (i.e., dedicated preambles/ROs/PUSCH resources) are provided by the gNB, the UE selects a non-dedicated preamble. Otherwise, the UE selects the dedicated preamble. During the RA procedure, one RA attempt may be 2-step CFRA, while another RA attempt may be 2-step CBRA.

Upon initiation of an RA procedure, the UE first selects the carrier (i.e., an SUL or NUL). If the carrier to use for the RA procedure is explicitly signaled by the gNB, the UE selects the signaled carrier for performing the RA procedure. If the carrier to use for the RA procedure is not explicitly signaled by the gNB, and if the serving cell for the RA procedure is configured with the SUL and if the RSRP of the DL pathloss reference is less than rsrp-ThresholdSSB-SUL, then the UE selects the SUL carrier for performing the RA procedure. Otherwise, the UE selects the NUL carrier for performing the RA procedure. Upon selecting the UL carrier, the UE determines the UL and DL BWP for RA procedure as specified in section 5.15 of technical specification (TS) 38.321. The UE then determines whether to perform 2-step or 4-step RA for this RA procedure.

If this RA procedure is initiated by a PDCCH order and if the ra-PreambleIndex explicitly provided by PDCCH is not 0b000000, the UE selects 4-step RA.

Otherwise, if 2-step CFRA resources are signaled by the gNB for this RA procedure, the UE selects 2-step RA.

Otherwise, if 4-step CFRA resources are signaled by the gNB for this RA procedure, the UE selects 4-step RA.

Otherwise, if the UL BWP selected for this RA procedure is configured with only 2-step RA resources, the UE selects 2-step RA.

Otherwise, if the UL BWP selected for this RA procedure is configured with only 4-step RA resources, the UE selects 4-step RA.

Otherwise, if the UL BWP selected for this RA procedure is configured with both 2-step and 4-step RA resources and an RSRP of the DL pathloss reference is below a configured threshold, the UE selects 4-step RA. Otherwise, the UE selects 2-step RA.

In the 2-step RA procedure, if the RA procedure is not successfully completed even after transmitting the MSGA a configurable number of times (e.g., indicated by a parameter msgATransMax), the UE switches to 4-step RA procedure. The UE performs RA attempts using the 4-step RA resources. If the UE is configured with 2-step CFRA resources, an RA attempt can be a 2-step CBRA or 2-step CFRA during the RA procedure. Switching to 4-step RA will result in not using the configured 2-step CFRA resources which are more efficient than 4-step RA resources. Therefore, an enhanced method is needed.

The above information is presented as background information only to assist with an understanding of the disclosure. No determination has been made, and no assertion is made, as to whether any of the above might be applicable as prior art with regard to the disclosure.

SUMMARY

The present disclosure provides an enhanced method of handling switching between 2-step and 4-step random access (RA). Switching to 4-step RA using the configured 2-step contention free random access (CFRA) resources which are more efficient than 4-step RA resources is provided.

Aspects of the present disclosure are to address at least the above-mentioned problems and/or disadvantages and to provide at least the advantages described below. Accordingly, an aspect of the present disclosure is to provide a communication method and system for converging a 5th generation (5G) communication system for supporting higher data rates beyond a 4th generation (4G) system.

Additional aspects will be set forth in part in the description which follows and, in part, will be apparent from the description, or may be learned by practice of the presented embodiments.

In accordance with an aspect of the disclosure, a method of a terminal for performing a random access (RA) procedure in a wireless communication system is provided. The method includes receiving from a base station, a radio resource control (RRC) reconfiguration message including dedicated configuration information for RA, identifying whether information on a maximum number of message A (MSGA) transmissions is configured in the dedicated configuration information, and in case that the information on the maximum number is configured in the dedicated configuration information, performing the RA procedure based on the information on the maximum number.

In accordance with another aspect of the disclosure, a method of a base station for performing an RA procedure in a wireless communication system is provided. The method includes transmitting, to a terminal, an RRC reconfiguration message including dedicated configuration information for an RA, wherein information on a maximum number for MSGA transmissions is configured in the dedicated configuration information, and performing the RA procedure based on the information on the maximum number.

In accordance with another aspect of the disclosure, a terminal for performing an RA procedure in a wireless communication system is provided. The terminal includes a transceiver and a controller coupled with the transceiver. The controller is configured to receive, from a base station via the transceiver, an RRC reconfiguration message including dedicated configuration information for an RA, identify whether information on a maximum number for MSGA transmissions is configured in the dedicated configuration information, and in case that the information on the maximum number is configured in the dedicated configuration information, perform the RA procedure based on the information on the maximum number.

In accordance with another aspect of the disclosure, a base station for performing an RA procedure in a wireless communication system is provided. The base station includes a transceiver and a controller coupled with the transceiver. The controller is configured to transmit, to a terminal via the transceiver, an RRC reconfiguration message including dedicated configuration information for an RA, wherein information on a maximum number for MSGA transmissions is configured in the dedicated configuration information, and perform the RA procedure based on the information on the maximum number.

Switching to 4-step RA can be implemented using the configured 2-step CFRA resources which are more efficient than 4-step RA resources. Thus, an enhanced method of handling switching between 2-step and 4-step RA is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
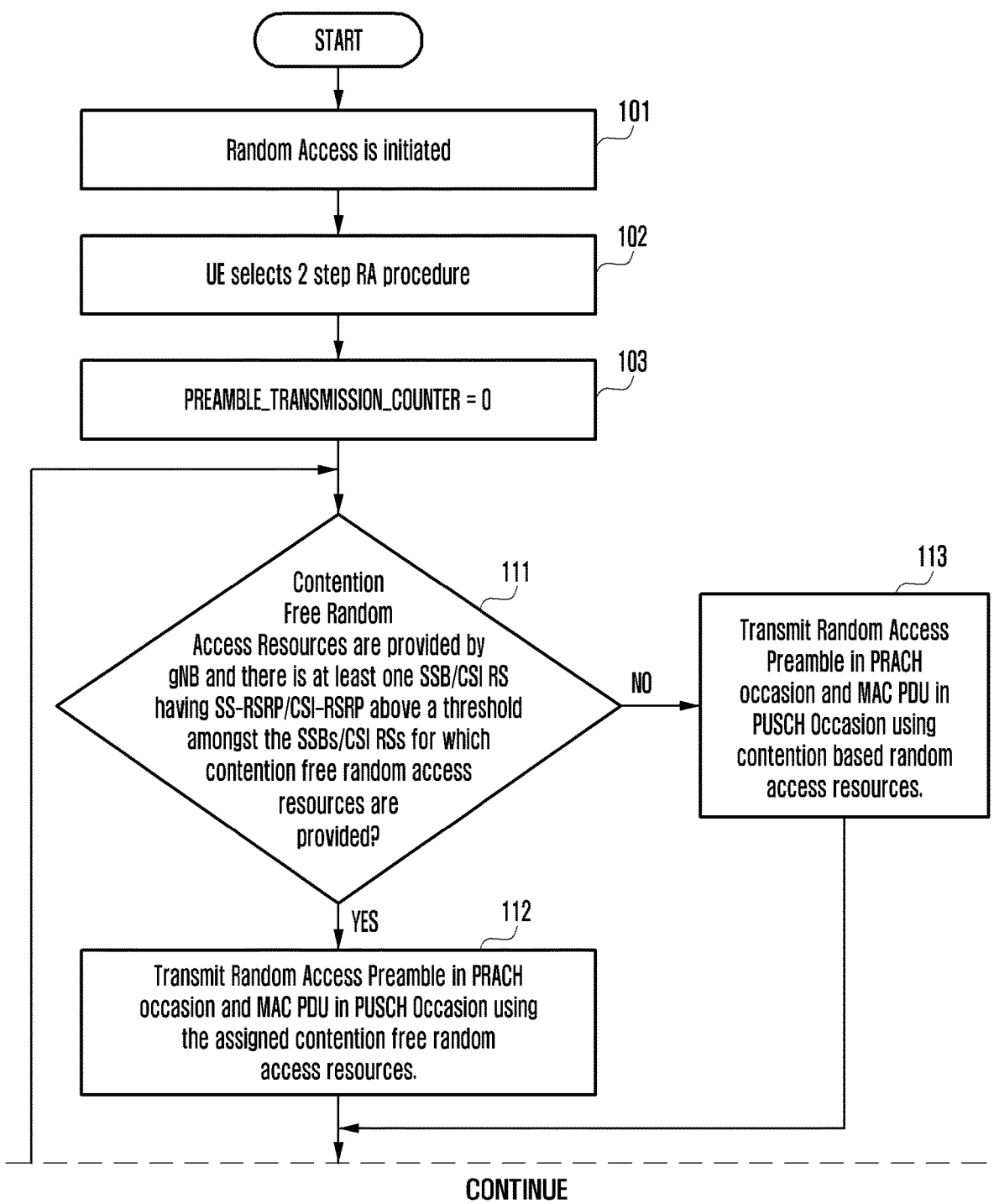
FIGS. 1A, 1B, 1C and 1D, illustrate an operation of a user equipment (UE) according to an embodiment of the disclosure.
Figure 1B:
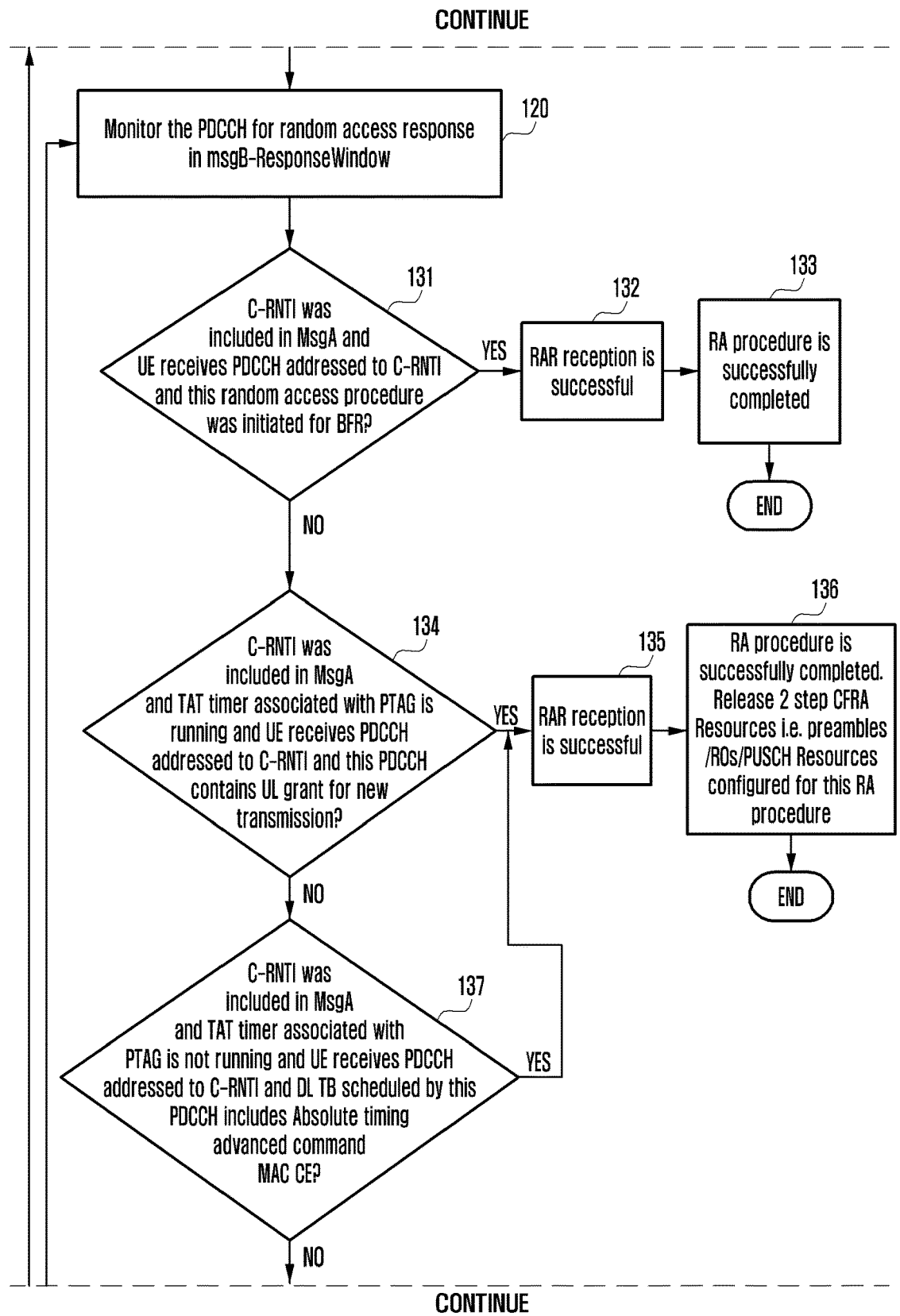
Figure 1C:
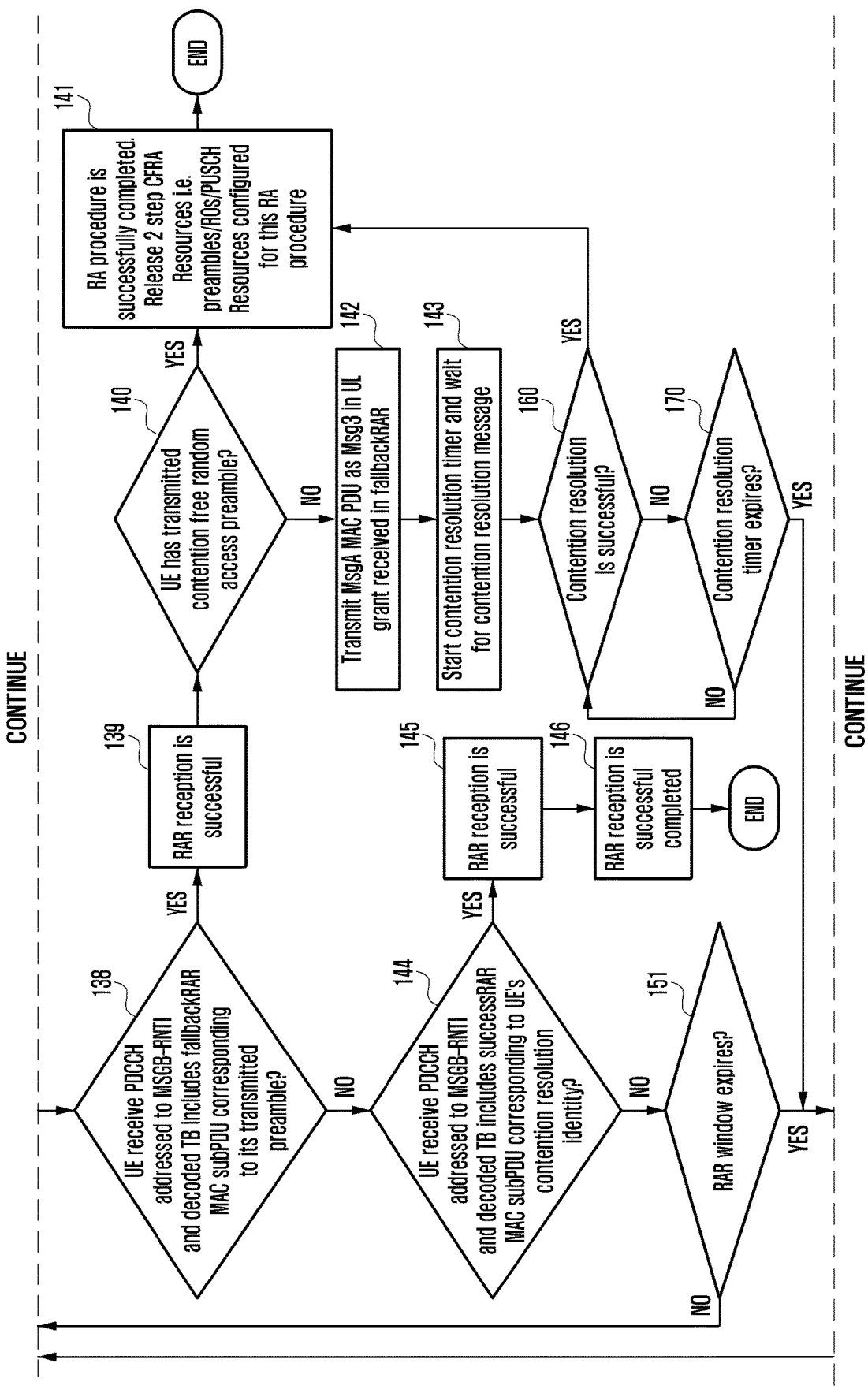
Figure 1D:
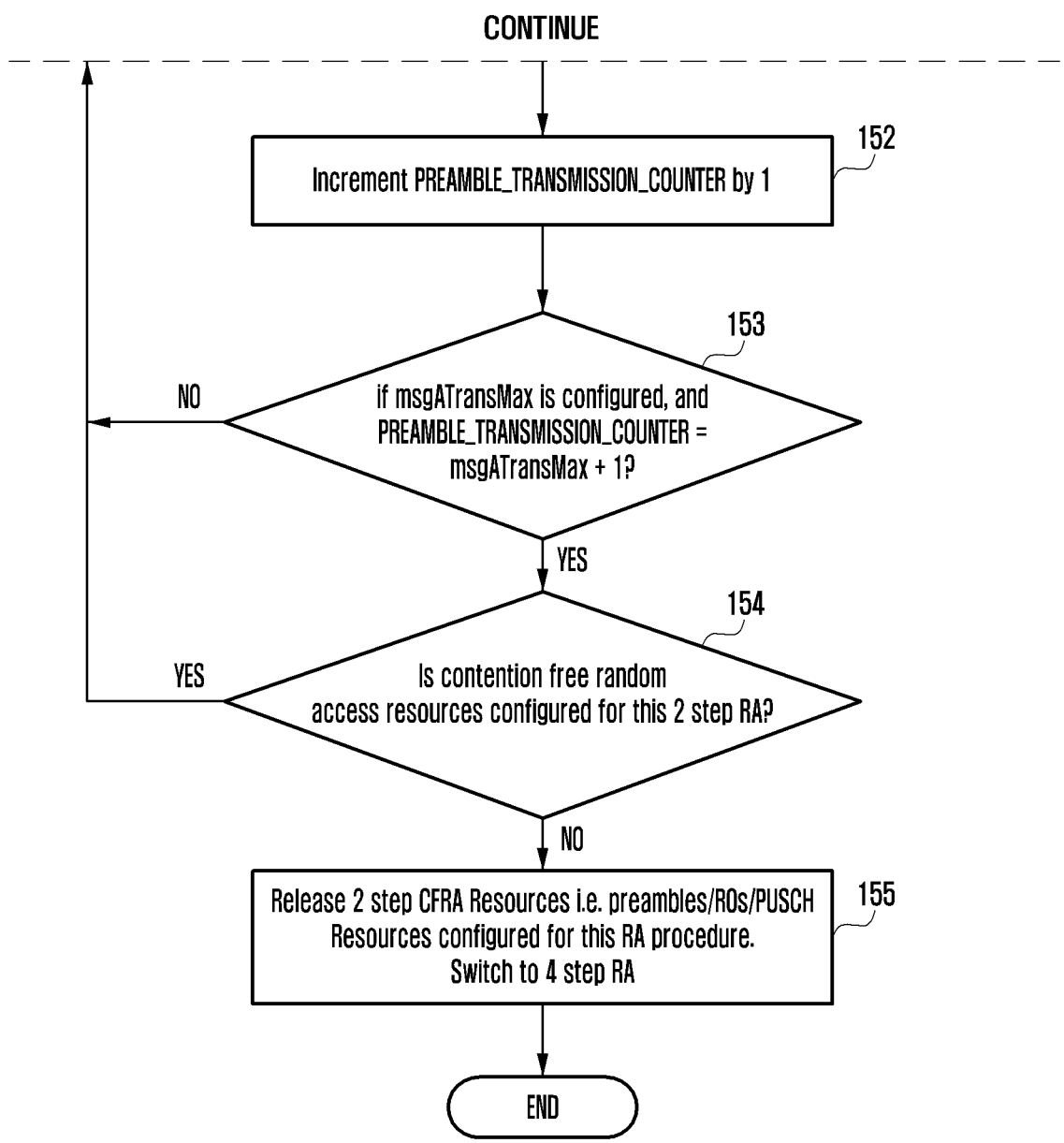

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module," or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to providing the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

Method 1:

FIGS. 1A to 1D illustrate an operation of a UE according to an embodiment of the disclosure.

Step 0: During the RA procedure initialization, the UE first selects the carrier (i.e., supplementary uplink (SUL) or normal uplink (NUL)). If the carrier to use for the RA procedure is explicitly signaled by a gNB, the UE selects the signaled carrier for performing the RA procedure. If the carrier to use for the RA procedure is not explicitly signaled, and if the serving cell for the RA procedure is configured with SUL, and if the reference signal received power (RSRP) of the downlink (DL) pathloss reference is less than rsrp-ThresholdSSB-SUL, then the UE selects the SUL carrier for performing the RA procedure. Otherwise, the UE selects the NUL carrier for performing the RA procedure.

Upon selecting the UL carrier, the UE determines the UL and DL bandwidth part (BWP) for the RA procedure as specified in section 5.15 of technical specification (TS) 38.321.

The UE then determines whether to perform 2-step or 4-step RA for this RA procedure.

If this RA procedure is initiated by a physical downlink control channel (PDCCH) order and if the ra-PreambleIndex explicitly provided by the PDCCH is not 0b000000, the UE selects 4-step RA.

Otherwise, if 2-step contention free random access (CFRA) resources are signaled by the gNB for this RA procedure, the UE selects 2-step RA.

Otherwise, if 4-step CFRA resources are signaled by the gNB for this RA procedure, the UE selects 4-step RA.

Otherwise, if the UL BWP selected for this RA procedure is configured with only 2-step RA resources, the UE selects 2-step RA.

Otherwise, f the UL BWP selected for this RA procedure is configured with only 4-step RA resources, the UE selects 4-step RA.

Otherwise, if the UL BWP selected for this RA procedure is configured with both 2-step and 4-step RA resources and an RSRP of the DL pathloss reference is below a configured threshold, the UE selects 4-step RA. Otherwise, the UE selects 2-step RA.

The UL carrier for the RA procedure is explicitly signaled by the gNB during handover or reconfiguration with synchronization for 4-step RA. If the gNB wants the UE to select the NUL for 4-step RA, the gNB provides 4-step CFRA resources for the NUL in a reconfiguration message. If the gNB wants the UE to select the SUL for 4-step RA, the gNB provides 4-step CFRA resources for SUL in the reconfiguration message. In an embodiment, the UL carrier for 2-step RA procedure is also explicitly signaled by the gNB during handover or reconfiguration with synchronization. If the gNB wants the UE to select NUL for 2-step RA, it provides 2-step CFRA resources for NUL in the reconfiguration message. If the gNB wants the UE to select the SUL for 2-step RA, the gNB provides 2-step CFRA resources for the SUL in the reconfiguration message.

If 2-step CFRA resources for SUL are signaled by the gNB during handover or reconfiguration with synchronization, the UE selects the SUL and the RA type selected is 2-step RA. If 2-step CFRA resources for the NUL are signaled by the gNB during handover or reconfiguration with synchronization, the UE selects the NUL and the RA type selected is 2-step RA. If 4-step CFRA resources for the SUL are signaled by the gNB during handover or reconfiguration with synchronization, the UE selects the SUL and the RA type selected is 4-step RA. If 4-step CFRA resources for the NUL are signaled by the gNB during handover or reconfiguration with synchronization, the UE selects the NUL and the RA type selected is 4-step RA.

Referring to FIG. 1A, the UE initiates an RA procedure, at operation 101. Based on the above criteria, the UE has selected 2-step RA procedure, at operation 102. The UE initializes the preamble transmission counter (PREAMBLE_TRANSMISSION_COUNTER) to zero, at operation 103.

Step 1: The UE identifies whether CFRA resources are provided by the gNB and whether there is at least one synchronization signal and physical broadcast channel (PBCH) block (SSB)/channel state information reference signal (CSI-RS) having a synchronization signal (SS)-RSRP/CSI-RSRP above a threshold among the SSBs/CSI-RSs for which CFRA resources are provided, at operation 111. If CFRA resources are provided by the gNB and there is at least one SSB/CSI-RS having SS-RSRP/CSI-RSRP above the threshold among the SSBs/CSI-RSs for which CFRA resources are provided, the UE transmits the RA preamble in a physical random access channel (PRACH) occasion and media access control (MAC) protocol data unit (PDU) in a physical uplink shared channel (PUSCH) occasion using the assigned CFRA resources, at operation 112. Otherwise, the UE transmits the RA preamble in the PRACH occasion and MAC PDU in the PUSCH occasion using the contention based random access (CBRA) resources, at operation 113. In an embodiment, it is possible that a valid PUSCH occasion is not available corresponding to a selected SSB/CSI-RS, and in this case, the UE skips transmission of the message A (MSGA) MAC PDU.

Step 2: The UE then starts a msgB-ResponseWindow and monitors the PDCCH for a random access response (RAR) in the message B (msgB)-ResponseWindow at operation 120. The UE monitors the PDCCH of the special cell (SpCell) for an RAR identified by an MSGB-radio network temporary identifier (RNTI) while the msgB-ResponseWindow is running. If a cell-RNTI (C-RNTI) MAC control element (CE) was included in the MSGA, the UE additionally monitors the PDCCH of the SpCell for an RAR identified by the C-RNTI while the msgB-ResponseWindow is running.

Step 3: While msgB-ResponseWindow is running, the UE identifies whether a C-RNTI was included in the MSGA, the UE receives a PDCCH addressed to the C-RNTI, and this RA procedure was initiated for beam failure recovery (BFR), at operation 131.

If the C-RNTI was included in the MSGA and the UE receives the PDCCH addressed to the C-RNTI and this RA procedure was initiated for BFR, the UE determines that RAR reception is successful, at operation 132. The RA procedure is successfully completed, at operation 133. Go to step 8.

Otherwise, the UE identifies whether the C-RNTI was included in the MSGA and a TimingAllignementTimer (TAT) associated with a primary timing advance group (PTAG) is running, the UE receives the PDCCH addressed to the C-RNTI, and this PDCCH contains a UL grant for new transmission, at operation 134. If the C-RNTI was included in the MSGA, the TAT associated with the PTAG is running, the UE receives the PDCCH addressed to the C-RNTI, and this PDCCH contains a UL grant for new transmission, then the UE determines that RAR reception is successful, at operation 135. The RA procedure is successfully completed, at operation 136. The UE releases the 2-step CFRA resources (e.g., RA preamble(s), random access channel (RACH) occasions (ROs), PUSCH resources, etc.) configured (if any) for this RA procedure. Release here means that the UE will not use these resources for a subsequent RA procedure. Go to step 8. In an embodiment, a release operation might not be performed in this case, as contention free resources may not be configured for the case where the PTAG is running and RA is initiated for events other than BFR.

Otherwise, the UE identifies whether the C-RNTI was included in MSGA, the TAT associated with PTAG is not running, and the UE receives the PDCCH addressed to the C-RNTI and a DL transport block (TB) scheduled by this PDCCH includes an absolute timing advanced command MAC CE, at operation 137. If the C-RNTI was included in MSGA, the TAT associated with the PTAG is not running, the UE receives the PDCCH addressed to the C-RNTI, and the DL TB scheduled by this PDCCH includes the absolute timing advanced command MAC CE, then the UE determines that RAR reception is successful at operation 135. The RA procedure is successfully completed, at operation 136. The UE releases the 2-step CFRA resources (e.g., RA preamble(s), ROs, PUSCH resources, etc.) configured (if any) for this RA procedure. Go to step 8. Release here means that the UE will not use these resources for a subsequent RA procedure.

Otherwise, the UE identifies whether the UE receives a PDCCH addressed to MSGB-RNTI and a decoded TB includes a fallbackRAR MAC subPDU corresponding to the UE's transmitted preamble, at operation 138. If the UE receives the PDCCH addressed to the MSGB-RNTI and the decoded TB includes the fallbackRAR MAC subPDU corresponding to its transmitted preamble, then the UE determines that RAR reception is successful, at operation 139.

The UE identifies whether the UE has transmitted CFRA preamble, at operation 140. If the RA preamble transmitted is the CFRA preamble, then the RA procedure is successfully completed, at operation 141. The UE releases the 2-step CFRA resources (e.g., RA preamble(s), ROs, PUSCH resources, etc.) configured (if any) for this RA procedure. Go to step 8. Release here means that the UE will not use these resources for a subsequent RA procedure.

Otherwise, the UE transmits an MSGA MAC PDU as Msg3 in a UL grant received in fallbackRAR, at operation 142. The UE starts a contention resolution timer, at operation 143. Go to step 5.

Otherwise, the UE identifies whether the UE receives the PDCCH addressed to the MSGB-RNTI and the decoded TB includes a successRAR MAC subPDU corresponding to the UE's contention resolution identity, at operation 144. If the UE receives the PDCCH addressed to the MSGB-RNTI and the decoded TB includes the successRAR MAC subPDU corresponding to the UE's contention resolution identity (i.e., the contention resolution identity received matches the first 48 bits of a common control channel (CCCH) service data unit (SDU) transmitted in MSGA), then the UE determines that RAR reception is successful, at operation 145. The RA procedure is successfully completed, at operation 146. Go to step 8. Note that this is the case when the CCCH SDU is included in MSGA, and the UE is idle/inactive or performing an RRC connection re-establishment. For these cases, contention free resources are not configured, so there is no need to release. In an alternate embodiment, the UE releases the 2-step CFRA resources (e.g., RA preamble(s), ROs, PUSCH resources, etc.) configured (if any) for this RA procedure. Release here means that the UE will not use these resources for a subsequent RA procedure.

Step 4: The UE identifies whether the RAR window (i.e., msgB-ResponseWindow) expires, at operation 151. If the RAR window (i.e., msgB-ResponseWindow) expires, then the UE increments a preamble transmission counter by 1, at operation 152.

The UE identifies whether msgATransMax is configured and PREAMBLE_TRANSMISSION_COUNTER= msgATransMax+1, at operation 153.

If msgATransMax is configured, and if PREAMBLE_TRANSMISSION_COUNTER=msgATransMax+1, then the UE identifies whether CFRA resources are configured for this 2-step RA procedure, at operation 154. If CFRA resources are configured for this 2-step RA procedure, the method returns to the beginning, i.e., go to step 1. Otherwise, the UE switches to 4-step RA, at operation 155. The UE may release 2-step CFRA resources, i.e., preambles/ROs/PUSCH resources configured for this RA procedure. Go to step 7. Otherwise, go to step 1.

Step 5: While the contention resolution timer is running, the UE identifies whether contention resolution is successful, at operation 160.

If the RA procedure was initiated for BFR and the UE receives the PDCCH transmission addressed to the C-RNTI, the RA procedure was initiated by a PDCCH order and the UE receives the PDCCH transmission addressed to the C-RNTI, or the RA procedure was initiated by the MAC sublayer itself or by the RRC sublayer and the UE receives the PDCCH transmission addressed to the C-RNTI and contains a UL grant for a new transmission, then the UE determines that contention resolution is successful, and the RA procedure is successfully completed, at operation 141. The UE releases 2-step CFRA resources, i.e., preambles/ROs/PUSCH resources configured (if any) for this RA procedure. Go to step 8. Release here means that the UE will not use these resources for a subsequent RA procedure.

Step 6: If the contention resolution timer expires at operation 170, the UE increments the preamble transmission counter by 1, at operation 152.

The UE identifies whether msgATransMax is configured and PREAMBLE_TRANSMISSION_COUNTER= msgATransMax+1, at operation 153.

If msgATransMax is configured, and PREAMBLE_TRANSMISSION_COUNTER=msgATransMax+1, then the UE identifies whether CFRA resources are configured for this 2-step RA procedure, at operation 154. If CFRA resources are configured for this 2-step RA procedure, the method returns to the beginning, i.e., go to step 1. Otherwise, the UE switches to 4-step RA, at operation 155. The UE may release 2-step CFRA resources, i.e., preambles/ROs/PUSCH resources configured for this RA procedure. Go to step 7. Otherwise, go to step 1.

Step 7: The UE performs 4-step RA. If 4-step CFRA resources are configured, these will be released when the RA procedure is completed.

Step 8: Stop.

Method 2:

FIGS. 2A to 2D illustrate an operation of a UE according to another embodiment of the disclosure.

Step 0: During the RA procedure initialization, the UE first selects the carrier (i.e., an SUL or an NUL). If the carrier to use for the RA procedure is explicitly signaled by the gNB, the UE selects the signaled carrier for performing the RA procedure. If the carrier to use for the RA procedure is not explicitly signaled, the serving cell for the RA procedure is configured with the SUL, and the RSRP of the DL pathloss reference is less than rsrp-ThresholdSSB-SUL, then the UE selects the SUL carrier for performing the RA procedure. Otherwise, the UE selects the NUL carrier for performing the RA procedure.

Upon selecting the UL carrier, the UE determines the UL and DL BWP for the RA procedure as specified in section 5.15 of TS 38.321.

UE then determines whether to perform 2-step or 4-step RA for this RA procedure.

If this RA procedure is initiated by a PDCCH order and if the ra-PreambleIndex explicitly provided by the PDCCH is not 0b000000, the UE selects 4-step RA.

Otherwise, if 2-step CFRA resources are signaled by the gNB for this RA procedure, the UE selects 2-step RA.

Otherwise, if 4-step CFRA resources are signaled by the gNB for this RA procedure, the UE selects 4-step RA.

Otherwise, if the UL BWP selected for this RA procedure is configured with only 2-step RA resources, the UE selects 2-step RA.

Otherwise, if the UL BWP selected for this RA procedure is configured with only 4-step RA resources, the UE selects 4-step RA.

Otherwise, if the UL BWP selected for this RA procedure is configured with both 2-step and 4-step RA resources and the RSRP of the DL pathloss reference is below a configured threshold, the UE selects 4-step RA. Otherwise, the UE selects 2-step RA.

The UL carrier for the RA procedure is explicitly signaled by the gNB during handover or reconfiguration with synchronization for 4-step RA. If the gNB wants the UE to select the NUL for 4-step RA, the gNB provides 4-step CFRA resources for the NUL in a reconfiguration message. If the gNB wants the UE to select the SUL for 4-step RA, the gNB provides 4-step CFRA resources for the SUL in a reconfiguration message. In an embodiment, the UL carrier for 2-step RA procedure is also explicitly signaled by the gNB during handover or reconfiguration with synchronization. If the gNB wants the UE to select the NUL for 2-step RA, the gNB provides 2-step CFRA resources for the NUL in a reconfiguration message. If the gNB wants the UE to select the SUL for 2-step RA, the gNB provides 2-step CFRA resources for the SUL in a reconfiguration message.

If 2-step CFRA resources for the SUL are signaled by the gNB during handover or reconfiguration with synchronization, the UE selects the SUL and the RA type selected is 2-step RA. If 2-step CFRA resources for the NUL are signaled by the gNB during handover or reconfiguration with synchronization, the UE selects the NUL and the RA type selected is 2-step RA. If 4-step CFRA resources for the SUL are signaled by the gNB during handover or reconfiguration with synchronization, the UE selects the SUL and the RA type selected is 4-step RA. If 4-step CFRA resources for the NUL are signaled by the gNB during handover or reconfiguration with synchronization, the UE selects the NUL and the RA type selected is 4-step RA.

Figure 2A:
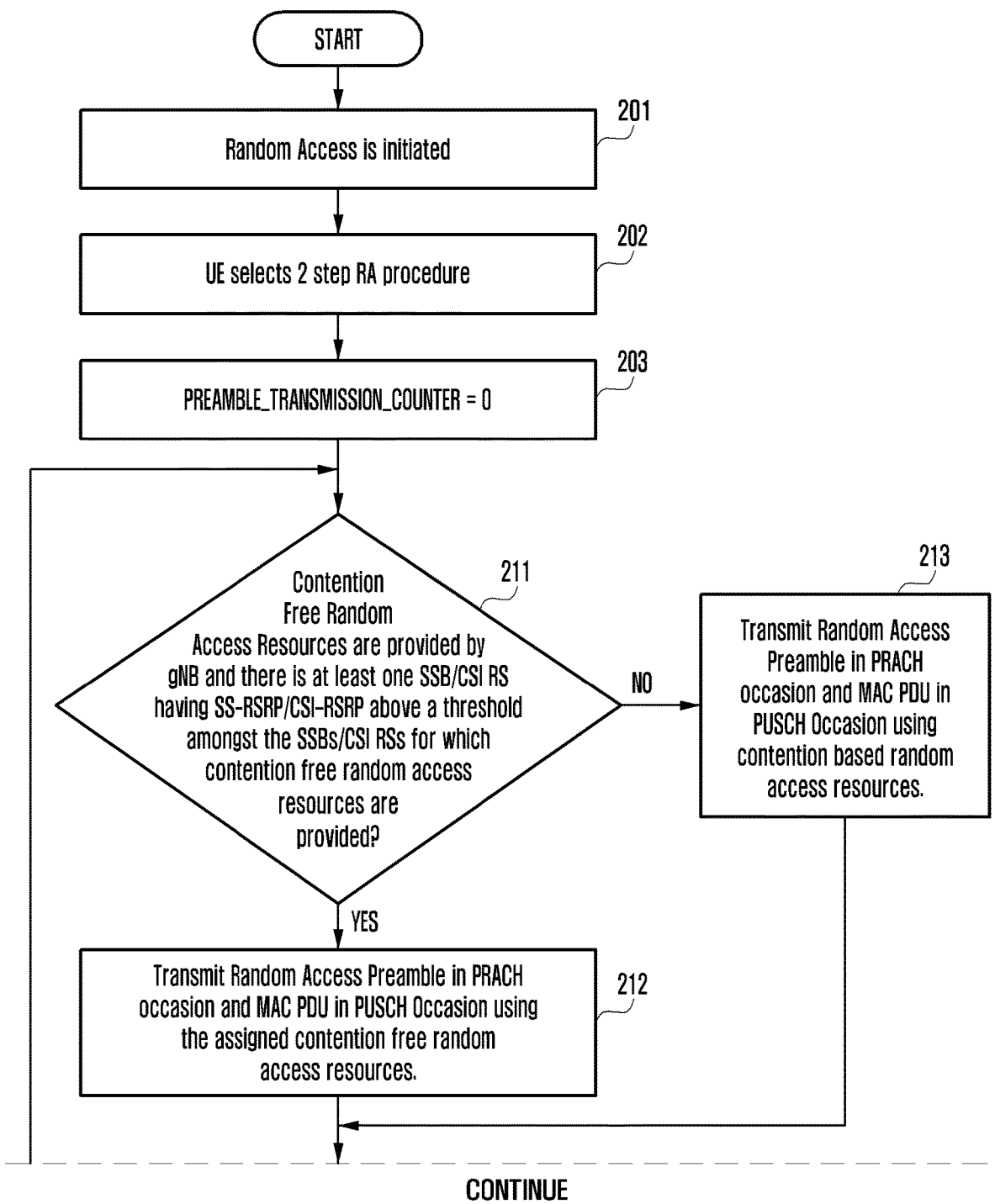
FIGS. 2A, 2B, 2C and 2D illustrate an operation of a UE according to another embodiment of the disclosure.
Figure 2B:
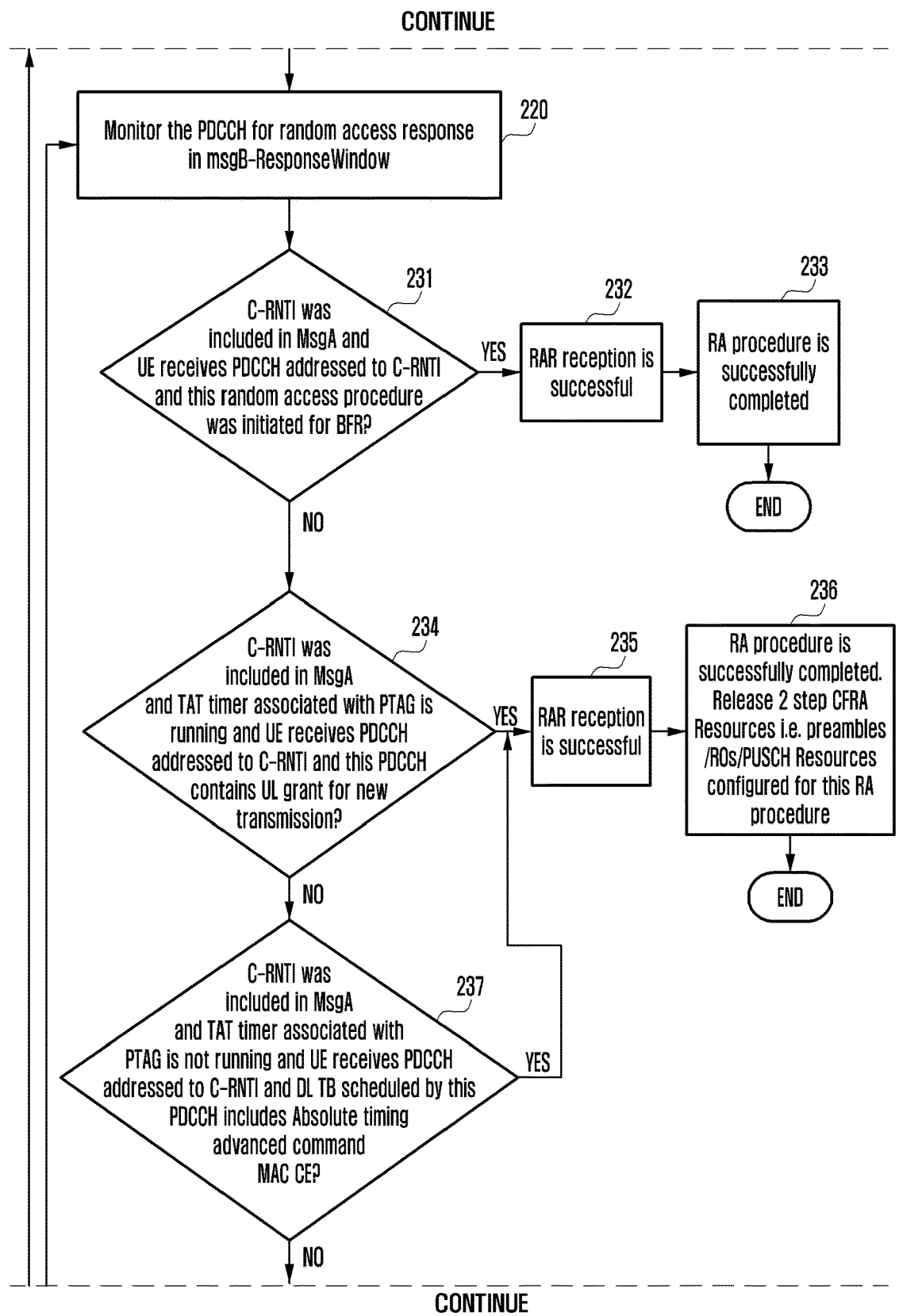
Figure 2C:
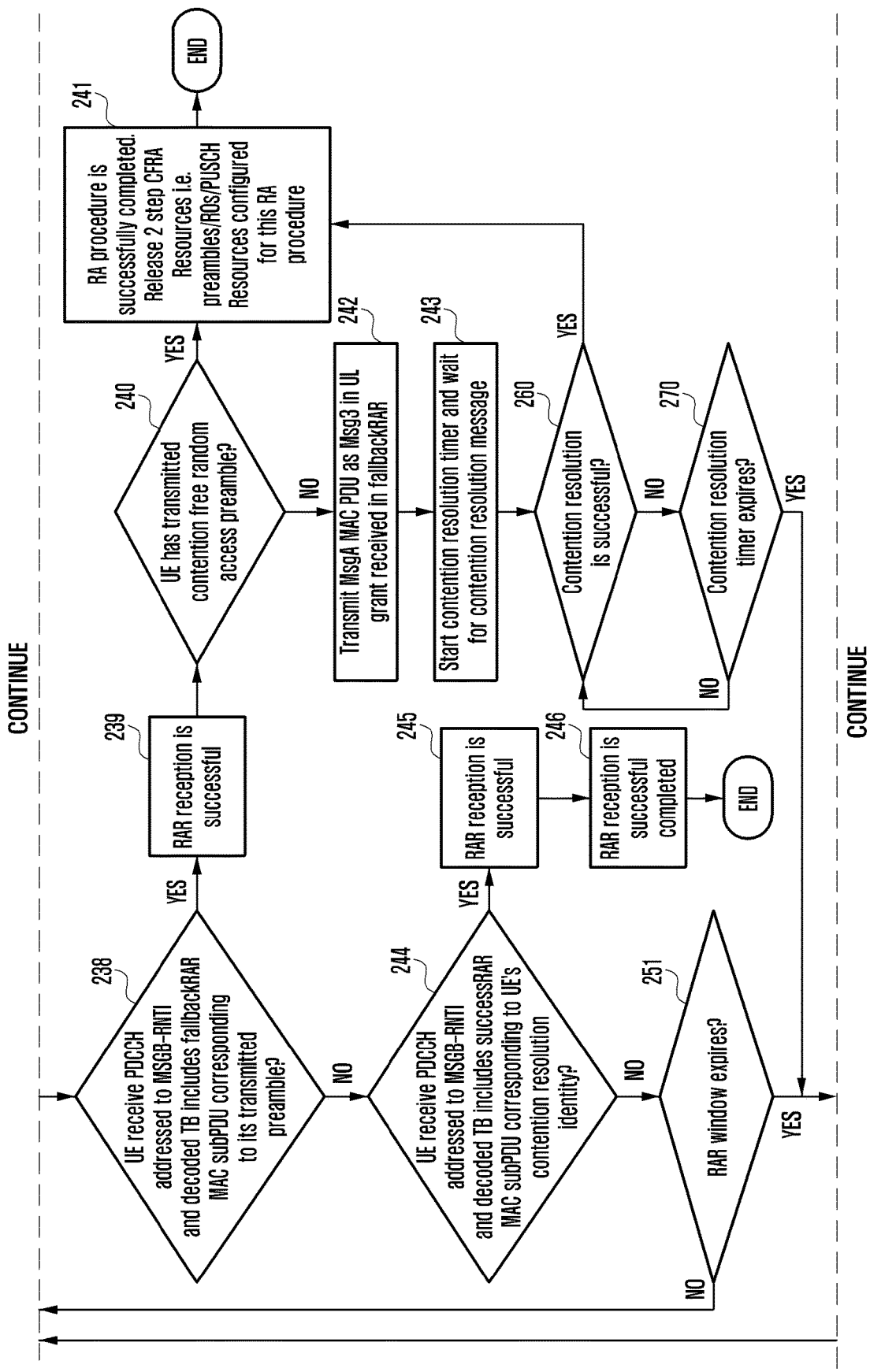
Figure 2D:
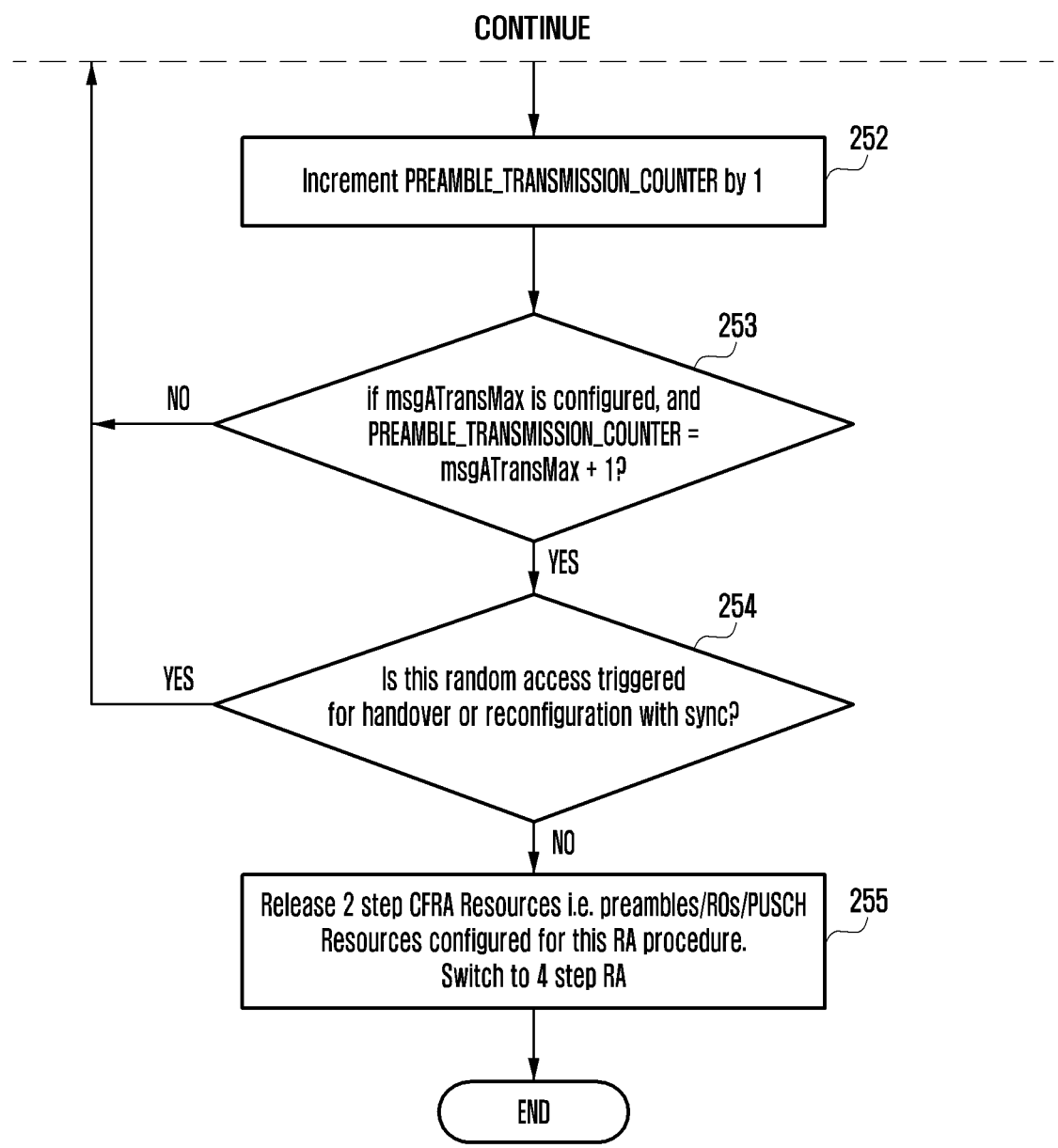

Referring to FIG. 2A, the UE initiates an RA procedure, at operation 201. Based on the above criteria, the UE has selected 2-step RA procedure, at operation 202. The UE initializes the preamble transmission counter (PREAMBLE_TRANSMISSION_COUNTER) to zero, at operation 203.

Step 1: The UE identifies whether CFRA resources are provided by the gNB and there is at least one SSB/CSI-RS having an SS-RSRP/CSI-RSRP above a threshold among the SSBs/CSI-RSs for which CFRA resources are provided, at operation 211. If CFRA resources are provided by the gNB and there is at least one SSB/CSI-RS having an SS-RSRP/CSI-RSRP above the threshold among the SSBs/CSI-RSs for which CFRA resources are provided, the UE transmits an RA preamble in a PRACH occasion and a MAC PDU in a PUSCH occasion using the assigned CFRA resources, at operation 212. Otherwise, the UE transmits the RA preamble in the PRACH occasion and the MAC PDU in the PUSCH occasion using the CBRA resources, at operation 213. In an embodiment, it is possible that a valid PUSCH occasion is not available corresponding to a selected SSB/CSI-RS, and in this case, the UE skips transmission of MSGA MAC PDU.

Step 2: The UE then starts a msgB-ResponseWindow and monitors the PDCCH for RAR in the msgB-ResponseWindow, at operation 220. The UE monitors the PDCCH of the SpCell for an RAR identified by MSGB-RNTI while the msgB-Response Window is running. If a C-RNTI MAC CE was included in the MSGA, then the UE additionally monitors the PDCCH of the SpCell for the RAR identified by the C-RNTI while the msgB-ResponseWindow is running.

Step 3: While the msgB-ResponseWindow is running, the UE identifies whether the C-RNTI was included in the MSGA, the UE receives PDCCH addressed to the C-RNTI, and this RA procedure was initiated for BFR, at operation 231.

If the C-RNTI was included in the MSGA, the UE receives the PDCCH addressed to the C-RNTI, and this RA procedure was initiated for BFR, then the UE determines that RAR reception is successful, at operation 232. The RA procedure is successfully completed, at operation 233. Go to step 8.

Otherwise, the UE identifies whether the C-RNTI was included in the MSGA, the TAT associated with the PTAG is running, the UE receives the PDCCH addressed to the C-RNTI, and this PDCCH contains a UL grant for new transmission, at operation 234. If the C-RNTI was included in the MSGA, the TAT associated with the PTAG is running, the UE receives the PDCCH addressed to the C-RNTI, and this PDCCH contains the UL grant for new transmission, then the UE determines that RAR reception is successful, at operation 235. The RA procedure is successfully completed, at operation 236. The UE releases the 2-step CFRA resources (e.g., RA preamble(s), ROs, PUSCH resources, etc.) configured (if any) for this RA procedure. Release here means that the UE will not use these resources for a subsequent RA procedure. Go to step 8. In an embodiment, a release operation might not be performed in this case, as contention free resources might not be configured for the case where the PTAG is running and RA is initiated for events other than BFR.

Otherwise, the UE identifies whether the C-RNTI was included in the MSGA, the TAT associated with PTAG is not running, the UE receives the PDCCH addressed to the C-RNTI, and a DL TB scheduled by this PDCCH includes an absolute timing advanced command MAC CE, at operation 237. If the C-RNTI was included in the MSGA, the TAT associated with PTAG is not running, the UE receives the PDCCH addressed to the C-RNTI, and the DL TB scheduled by this PDCCH includes an absolute timing advanced command MAC CE, then the UE determines that the RAR reception is successful, at operation 235. The RA procedure is successfully completed, at operation 236. The UE releases the 2-step CFRA resources (e.g., RA preamble(s), ROs, PUSCH resources, etc.) configured (if any) for this RA procedure. Release here means that the UE will not use these resources for a subsequent RA procedure.

Otherwise, the UE identifies whether the UE receives the PDCCH addressed to the MSGB-RNTI and the decoded TB includes a fallbackRAR MAC subPDU corresponding to the UE's transmitted preamble, at operation 238. If the UE receives the PDCCH addressed to the MSGB-RNTI and the decoded TB includes the fallbackRAR MAC subPDU corresponding to the UE's transmitted preamble, then the UE determines that the RAR reception is successful, at operation 239.

The UE identifies whether the UE has transmitted the CFRA preamble, at operation 240. If the RA preamble transmitted is the CFRA preamble, then the RA procedure is successfully completed, at operation 241. The UE releases the 2-step CFRA resources (e.g., RA preamble(s), ROs, PUSCH resources, etc.) configured (if any) for this RA procedure. Go to step 8. Release here means that the UE will not use these resources for a subsequent RA procedure.

Otherwise, the UE transmits the MSGA MAC PDU as Msg3 in UL grant received in fallbackRAR, at operation 242. The UE starts a contention resolution timer, at operation 243. Go to step 5.

Otherwise, the UE identifies whether the UE receives the PDCCH addressed to the MSGB-RNTI and the decoded TB includes a successRAR MAC subPDU corresponding to the UE's contention resolution identity, at operation 244. If the UE receives the PDCCH addressed to the MSGB-RNTI and the decoded TB includes the successRAR MAC subPDU corresponding to the UE's contention resolution identity (i.e., the contention resolution identity received matches the first 48 bits of the CCCH SDU transmitted in MSGA), then the UE determines that the RAR reception is successful, at operation 245. The RA procedure is successfully completed, at operation 246. Go to step 8. Note that this is the case when the CCCH SDU is included in the MSGA, and the UE is idle/inactive or performing an RRC connection re-establishment. For these cases, contention free resources are not configured, so there is no need to release. In an alternate embodiment, the UE releases the 2-step CFRA resources (e.g., RA preamble(s), ROs, PUSCH resources, etc.) configured (if any) for this RA procedure. Release here means that the UE will not use these resources for a subsequent RA procedure.

Step 4: The UE identifies whether the RAR window (i.e., msgB-ResponseWindow) expires, at operation 251. If the RAR window (i.e., msgB-ResponseWindow) expires, then the UE increments the preamble transmission counter by 1, at operation 252.

The UE identifies whether msgATransMax is configured and PREAMBLE_TRANSMISSION_COUNTER= msgATransMax+1, at operation 253.

If msgATransMax is configured, and if PREAMBLE_TRANSMISSION_COUNTER=msgATransMax+1, then the UE identifies whether this RA procedure is triggered for handover or reconfiguration with synchronization, at operation 254. If this RA procedure is triggered for handover or reconfiguration with synchronization, the method returns to the beginning, i.e., go to step 1. Otherwise, the UE releases 2-step CFRA resources, i.e., preambles/ROs/PUSCH resources configured (if any) for this RA procedure, at operation 255. Release here means that the UE will not use these resources for remaining RA attempts of this RA procedure, and will also not use these resources for a subsequent RA procedure. The UE switches to 4-step RA. Go to step 7.

Otherwise, go to step 1.

Step 5: While the contention resolution timer is running, the UE identifies whether contention resolution is successful, at operation 260.

If the RA procedure was initiated for BFR and the UE receives PDCCH transmission addressed to the C-RNTI, or if the RA procedure was initiated by a PDCCH order and the UE receives the PDCCH transmission addressed to the C-RNTI, or if the RA procedure was initiated by the MAC sublayer itself or by the RRC sublayer and the UE receives the PDCCH transmission addressed to the C-RNTI and contains a UL grant for a new transmission, then the UE determines that contention resolution is successful, and the RA procedure is successfully completed, at operation 241. The UE releases 2-step CFRA resources, i.e., preambles/ROs/PUSCH resources configured (if any) for this RA procedure. Go to step 8. Release here means that the UE will not use these resources for a subsequent RA procedure.

Step 6: If the contention resolution timer expires at operation 270, then the UE increments the preamble transmission counter by 1, at operation 252.

The UE identifies whether msgATransMax is configured and PREAMBLE_TRANSMISSION_COUNTER=msgATransMax+1, at operation 253.

If msgATransMax is configured, and if PREAMBLE_TRANSMISSION_COUNTER=msgATransMax+1, then the UE identifies whether this RA procedure is triggered for handover or reconfiguration with synchronization, at operation 254. If this RA procedure is triggered for handover or reconfiguration with synchronization, then the method returns to the beginning, i.e., go to step 1. In other words, parameter msgATransMax is not used for an RA procedure triggered for handover or reconfiguration with synchronization. Otherwise, the UE releases 2-step CFRA resources, i.e., preambles/ROs/PUSCH resources configured (if any) for this RA procedure, at operation 255. Release here means that the UE will not use these resources for remaining RA attempts of this RA procedure, and will also not use these resources for a subsequent RA procedure. The UE switches to 4-step RA. Go to step 7.

Otherwise, go to step 1.

Step 7: The UE performs 4-step RA. If 4-step CFRA resources are configured, these will be released when the RA procedure is completed.

Step 8: Stop.

Method 3:

Step 0: During the RA procedure initialization, the UE first selects the carrier (the SUL or the NUL). If the carrier to use for the RA procedure is explicitly signaled by the gNB, the UE selects the signaled carrier for performing the RA procedure. If the carrier to use for the RA procedure is not explicitly signaled, the serving cell for the RA procedure is configured with the SUL, and the RSRP of the DL pathloss reference is less than rsrp-ThresholdSSB-SUL, then the UE selects the SUL carrier for performing the RA procedure. Otherwise, the UE selects the NUL carrier for performing the RA procedure.

Upon selecting the UL carrier, the UE determines the UL and DL BWP for the RA procedure as specified in section 5.15 of TS 38.321.

The UE then determines whether to perform 2-step or 4-step RA for this RA procedure.

If this RA procedure is initiated by a PDCCH order and if the ra-PreambleIndex explicitly provided by PDCCH is not 0b000000, the UE selects 4-step RA.

Otherwise, if 2-step CFRA resources are signaled by the gNB for this RA procedure, the UE selects 2-step RA.

Otherwise, if 4-step CFRA resources are signaled by the gNB for this RA procedure, the UE selects 4-step RA.

Otherwise, if the UL BWP selected for this RA procedure is configured with only 2-step RA resources, the UE selects 2-step RA.

Otherwise, if the UL BWP selected for this RA procedure is configured with only 4-step RA resources, the UE selects 4-step RA.

Otherwise, if the UL BWP selected for this RA procedure is configured with both 2-step and 4-step RA resources and an RSRP of the DL pathloss reference is below a configured threshold, the UE selects 4-step RA. Otherwise, the UE selects 2-step RA.

The UL carrier for the RA procedure is explicitly signaled by the gNB during handover or reconfiguration with synchronization for 4-step RA. If the gNB wants the UE to select the NUL for 4-step RA, the gNB provides 4-step CFRA resources for the NUL in a reconfiguration message. If the gNB wants the UE to select the SUL for 4-step RA, the gNB provides 4-step CFRA resources for the SUL in the reconfiguration message. In an embodiment, the UL carrier for 2-step RA procedure is also explicitly signaled by the gNB during handover or reconfiguration with synchronization. If the gNB wants the UE to select the NUL for 2-step RA, the gNB provides 2-step CFRA resources for the NUL in the reconfiguration message. If the gNB wants the UE to select the SUL for 2-step RA, the gNB provides 2-step CFRA resources for the SUL in the reconfiguration message.

If 2-step CFRA resources for the SUL are signaled by the gNB during handover or reconfiguration with synchronization, the UE selects the SUL and the RA type selected is 2-step RA. If 2-step CFRA resources for the NUL are signaled by the gNB during handover or reconfiguration with synchronization, the UE selects the NUL and the RA type selected is 2-step RA. If 4-step CFRA resources for the SUL are signaled by the gNB during handover or reconfiguration with synchronization, the UE selects the SUL and the RA type selected is 4-step RA. If 4-step CFRA resources for the NUL are signaled by the gNB during handover or reconfiguration with synchronization, the UE selects the NUL and the RA type selected is 4-step RA.

Based on the above criteria, the UE has selected 2-step RA procedure. The UE initializes the preamble transmission counter (PREAMBLE_TRANSMISSION_COUNTER) to zero.

Step 1: If CFRA resources are provided by the gNB and there is at least one SSB/CSI-RS having an SS-RSRP/CSI-RSRP above a threshold among the SSBs/CSI-RSs for which CFRA resources are provided, the UE transmits an RA preamble in a PRACH occasion and a MAC PDU in a PUSCH occasion using the assigned CFRA resources. Otherwise, the UE transmits the RA preamble in the PRACH occasion and the MAC PDU in the PUSCH occasion using the CBRA resources. In an embodiment, it is possible that a valid PUSCH occasion is not available corresponding to a selected SSB/CSI-RS, and in this case, the UE skips transmission of the MSGA MAC PDU.

Step 2: The UE then starts a msgB-ResponseWindow and monitors the PDCCH for an RAR in the msgB-ResponseWindow. The UE monitors the PDCCH of the SpCell for an RAR identified by MSGB-RNTI while the msgB-ResponseWindow is running. If a C-RNTI MAC CE was included in the MSGA, then the UE additionally monitors the PDCCH of the SpCell for the RAR identified by the C-RNTI while the msgB-ResponseWindow is running.

Step 3: While msgB-ResponseWindow is running:

If the C-RNTI was included in the MSGA, the UE receives the PDCCH addressed to the C-RNTI, and this RA procedure was initiated for BFR, then the RAR reception is successful. The RA procedure is successfully completed. Go to step 8.

Otherwise, if the C-RNTI was included in the MSGA, a TAT associated with a PTAG is running, the UE receives the PDCCH addressed to the C-RNTI, and this PDCCH contains a UL grant for new transmission, then the RAR reception is successful. The RA procedure is successfully completed. The UE releases the 2-step CFRA resources (e.g., RA preamble(s), ROs, PUSCH resources, etc.) configured (if any) for this RA procedure. Release here means that the UE will not use these resources for a subsequent RA procedure. Go to step 8. In an embodiment, a release operation might not be performed in this case, as contention free resources might not be configured for the case where the PTAG is running and the RA is initiated for events other than BFR.

Otherwise, if the C-RNTI was included in the MSGA, the TAT associated with the PTAG is not running, the UE receives PDCCH addressed to the C-RNTI, and a DL TB scheduled by this PDCCH includes an absolute timing advanced command MAC CE, then the RAR reception is successful. The RA procedure is successfully completed. The UE releases the 2-step CFRA resources (e.g., RA preamble(s), ROs, PUSCH resources, etc.) configured (if any) for this RA procedure. Go to step 8. Release here means that the UE will not use these resources for a subsequent RA procedure.

Otherwise, if the UE receives the PDCCH addressed to the MSGB-RNTI and the decoded TB includes a fallbackRAR MAC subPDU corresponding to its transmitted preamble, then the RAR reception is successful.

If the RA preamble transmitted is a CFRA preamble, then the RA procedure is successfully completed. The UE releases the 2-step CFRA resources (e.g., RA preamble(s), ROs, PUSCH resources, etc.) configured (if any) for this RA procedure. Go to step 8. Release here means that the UE will not use these resources for a subsequent RA procedure.

Otherwise, the UE transmits the MSGA MAC PDU as Msg3 in a UL grant received in the fallbackRAR. The UE starts a contention resolution timer. Go to step 5.

Otherwise, if the UE receives the PDCCH addressed to the MSGB-RNTI and the decoded TB includes a successRAR MAC subPDU corresponding to the UE's contention resolution identity (i.e., the contention resolution identity received matches the first 48 bits of a CCCH SDU transmitted in the MSGA), then the RAR reception is successful. The RA procedure is successfully completed. Go to step 8. Note that this is the case when the CCCH SDU is included in the MSGA, and the UE is idle/inactive or performing an RRC connection re-establishment. For these cases, contention free resources are not configured, so there is no need to release. In an alternate embodiment, the UE releases the 2-step CFRA resources (e.g., RA preamble(s), ROs, PUSCH resources, etc.) configured (if any) for this RA procedure. Release here means that the UE will not use these resources for a subsequent RA procedure.

Step 4: If the RAR window (i.e., msgB-ResponseWindow) expires, then the UE increments the preamble transmission counter by 1.

If msgATransMax is configured, and if PREAMBLE_TRANSMISSION_COUNTER=msgATransMax+1, then the UE identifies whether this RA procedure is triggered for handover or reconfiguration with synchronization and CFRA resources are configured for this 2-step RA procedure. If this RA procedure is triggered for handover or reconfiguration with synchronization and CFRA resources are configured for this 2-step RA procedure, then the method returns to the beginning, i.e., go to step 1. In other words, parameter msgATransMax is not used for 2-step RA procedure triggered for handover or reconfiguration with synchronization if CFRA resources are configured for this 2-step RA procedure. Otherwise, the UE releases 2-step CFRA resources, i.e., preambles/ROs/PUSCH resources configured (if any) for this RA procedure. Release here means that the UE will not use these resources for remaining RA attempts of this RA procedure, and will also not use these resources for a subsequent RA procedure. The UE switches to 4-step RA. Go to step 7. Otherwise the method returns to the beginning, i.e., go to step 1.

Step 5: While a contention resolution timer is running:

If the RA procedure was initiated for BFR and the UE receives a PDCCH transmission addressed to the C-RNTI, or the RA procedure was initiated by a PDCCH order and the UE receives the PDCCH transmission addressed to the C-RNTI, or the RA procedure was initiated by the MAC sublayer itself or by the RRC sublayer and the UE receives the PDCCH transmission addressed to the C-RNTI and contains a UL grant for a new transmission, the contention resolution is successful and the RA procedure is successfully completed. The UE releases 2-step CFRA resources, i.e., preambles/ROs/PUSCH resources configured (if any) for this RA procedure. Release here means that the UE will not use these resources for a subsequent RA procedure.

Step 6: If the contention resolution timer expires, the UE increments the preamble transmission counter by 1.

If msgATransMax is configured, and if PREAMBLE_TRANSMISSION_COUNTER=msgATransMax+1, then the UE identifies whether this RA procedure is triggered for handover or reconfiguration with synchronization and CFRA resources are configured for this 2-step RA procedure. If this RA procedure is triggered for handover or reconfiguration with synchronization and the CFRA resources are configured for this 2-step RA procedure, then the method returns to the beginning, i.e., go to step 1. In other words, the parameter msgATransMax is not used for 2-step RA procedure triggered for handover or reconfiguration with synchronization if the CFRA resources are configured for this 2-step RA procedure. Otherwise, the UE releases 2-step CFRA resources, i.e., preambles/ROs/PUSCH resources configured (if any) for this RA procedure. Go to step 8. Release here means that the UE will not use these resources for remaining RA attempts of this RA procedure, and will also not use these resources for a subsequent RA procedure. The UE switches to 4-step RA. Go to step 7. Otherwise, the method returns to the beginning, i.e., go to step 1.

Step 7: The UE performs 4-step RA. If 4-step CFRA resources are configured, these will be released when the RA procedure is completed.

Step 8: Stop.

Method 4:

FIGS. 3A to 3D illustrate an operation of a UE according to another embodiment of the disclosure.

Step 0: During the RA procedure initialization, the UE first selects the carrier (the SUL or the NUL). If the carrier to use for the RA procedure is explicitly signaled by the gNB, the UE selects the signaled carrier for performing the RA procedure. If the carrier to use for the RA procedure is not explicitly signaled, the serving cell for the RA procedure is configured with the SUL, and the RSRP of the DL pathloss reference is less than rsrp-ThresholdSSB-SUL, then the UE selects the SUL carrier for performing the RA procedure. Otherwise, the UE selects the NUL carrier for performing the RA procedure.

Upon selecting the UL carrier, the UE determines the UL and DL BWP for the RA procedure as specified in section 5.15 of TS 38.321.

The UE then determines whether to perform 2-step or 4-step RA for this RA procedure.

If this RA procedure is initiated by a PDCCH order and if the ra-PreambleIndex explicitly provided by PDCCH is not 0b000000, the UE selects 4-step RA.

Otherwise, if 2-step CFRA resources are signaled by the gNB for this RA procedure, the UE selects 2-step RA.

Otherwise, if 4-step CFRA resources are signaled by the gNB for this RA procedure, the UE selects 4-step RA.

Otherwise, if the UL BWP selected for this RA procedure is configured with only 2-step RA resources, the UE selects 2-step RA.

Otherwise, if the UL BWP selected for this RA procedure is configured with only 4-step RA resources, the UE selects 4-step RA.

Otherwise, if the UL BWP selected for this RA procedure is configured with both 2-step and 4-step RA resources and an RSRP of the DL pathloss reference is below a configured threshold, the UE selects 4-step RA. Otherwise, the UE selects 2-step RA.

The UL carrier for the RA procedure is explicitly signaled by the gNB during handover or reconfiguration with synchronization for 4-step RA. If the gNB wants the UE to select the NUL for 4-step RA, the gNB provides 4-step CFRA resources for the NUL in a reconfiguration message. If the gNB wants the UE to select the SUL for 4-step RA, the gNB provides 4-step CFRA resources for the SUL in the reconfiguration message. In an embodiment, the UL carrier for 2-step RA procedure is also explicitly signaled by the gNB during handover or reconfiguration with synchronization. If the gNB wants the UE to select the NUL for 2-step RA, the gNB provides 2-step CFRA resources for the NUL in the reconfiguration message. If the gNB wants the UE to select the SUL for 2-step RA, the gNB provides 2-step CFRA resources for the SUL in reconfiguration message.

If 2-step CFRA resources for the SUL are signaled by the gNB during handover or reconfiguration with synchronization, the UE selects the SUL and the RA type selected is 2-step RA. If 2-step CFRA resources for the NUL are signaled by the gNB during handover or reconfiguration with synchronization, the UE selects the NUL and the RA type selected is 2-step RA. If 4-step CFRA resources for the SUL are signaled by the gNB during handover or reconfiguration with synchronization, the UE selects the SUL and the RA type selected is 4-step RA. If 4-step CFRA resources for the NUL are signaled by the gNB during handover or reconfiguration with synchronization, the UE selects the NUL and the RA type selected is 4-step RA.

Figure 3A:
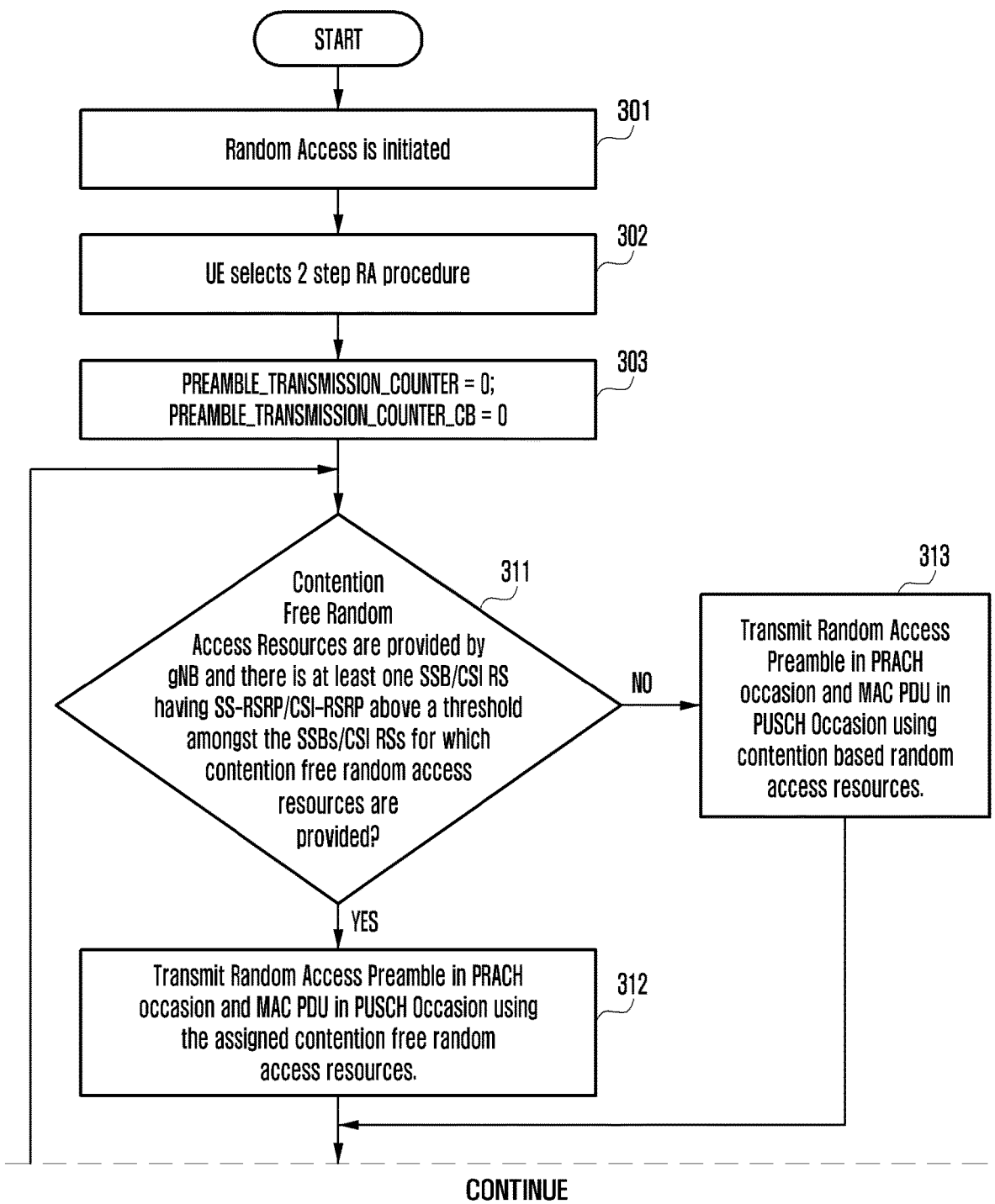
FIGS. 3A, 3B, 3C and 3D illustrate an operation of a UE according to another embodiment of the disclosure.
Figure 3B:
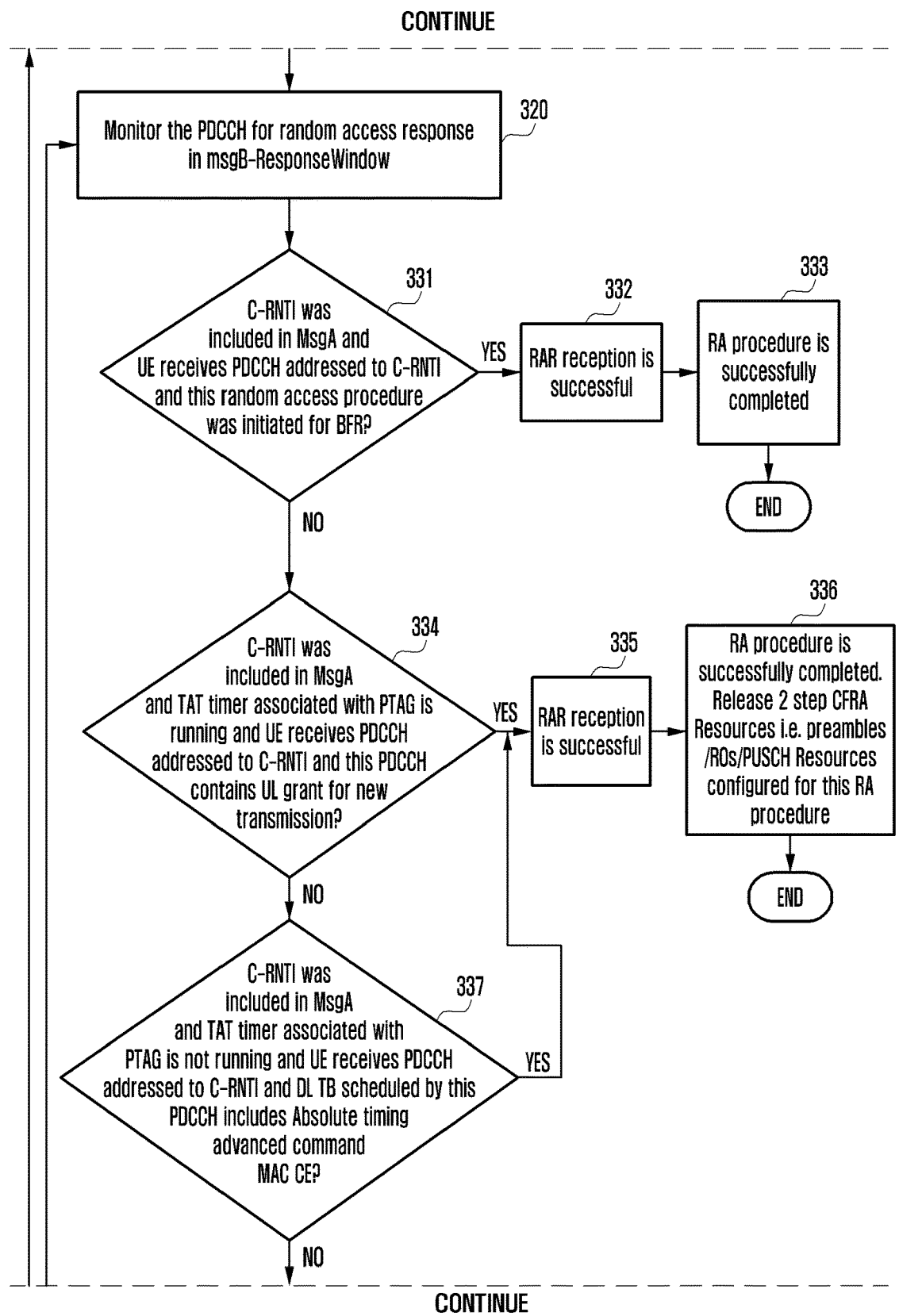
Figure 3C:
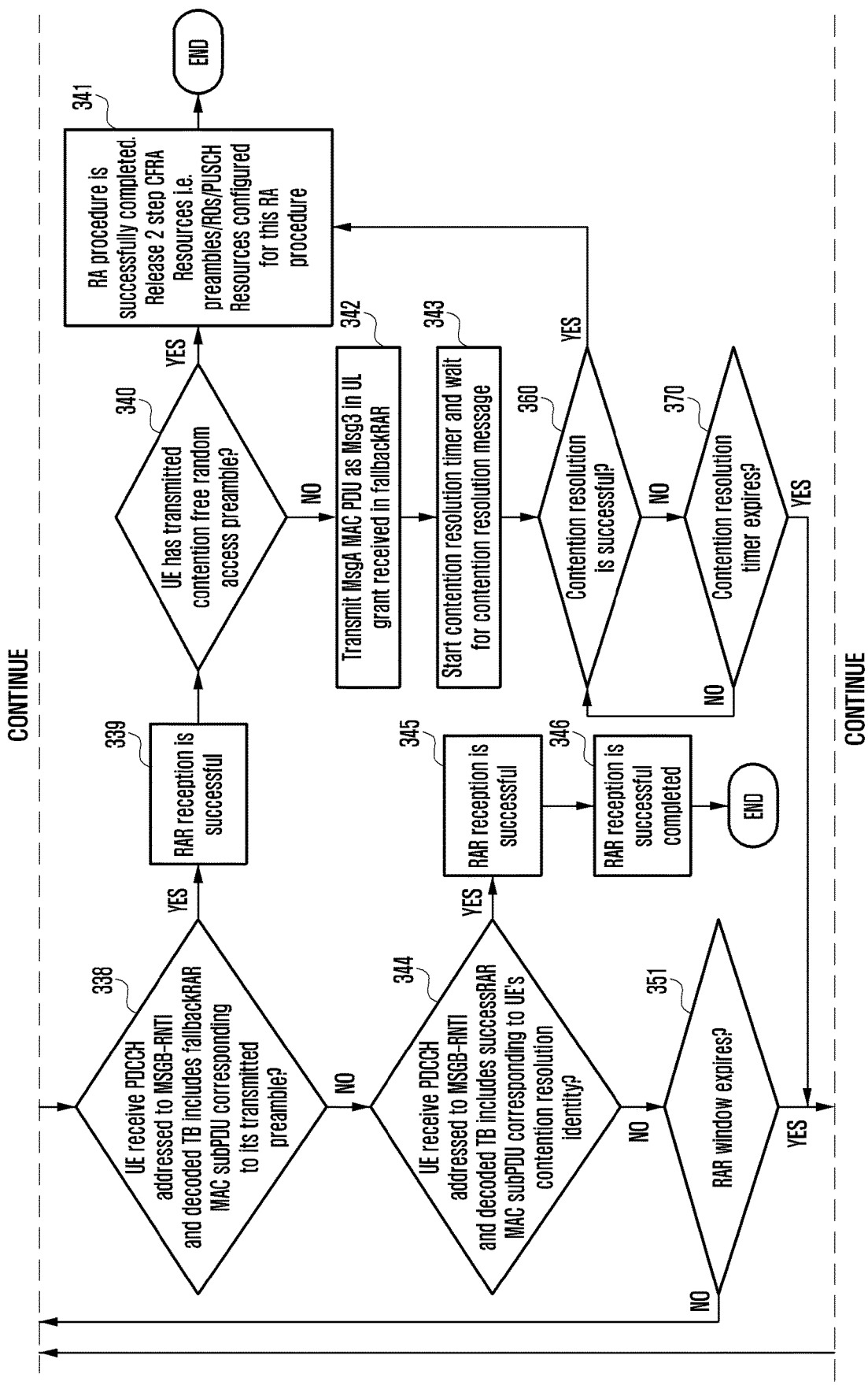
Figure 3D:
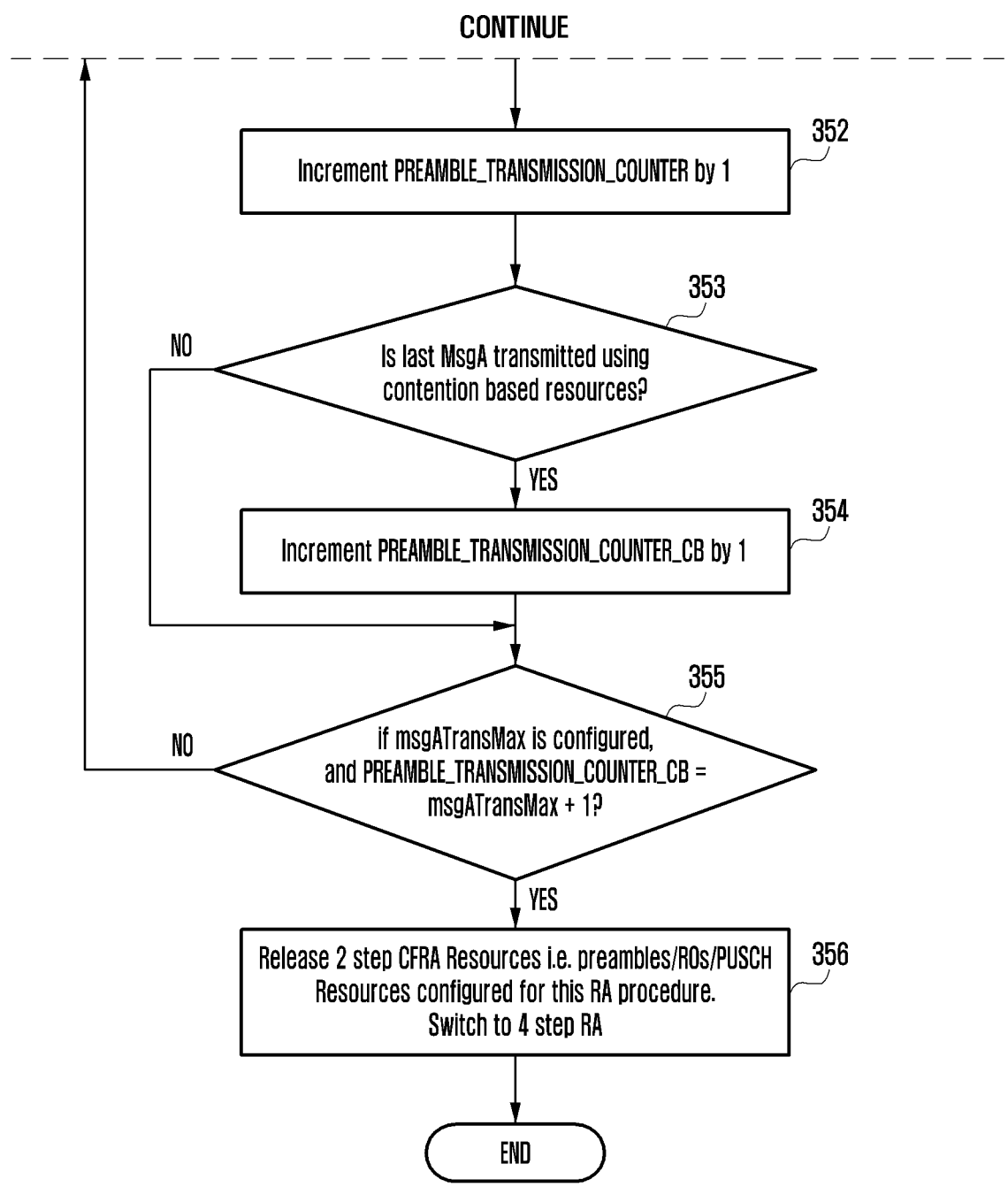

Referring to FIG. 3A, the UE initiates an RA procedure, at operation 301. Based on the above criteria, the UE has selected 2-step RA procedure, at operation 302. The UE initializes the preamble transmission counter (PREAMBLE_TRANSMISSION_COUNTER) to zero, at operation 303. A new counter PREAMBLE_TRANSMISSION_COUNTER_CB is introduced and is also initialized to zero.

Step 1: The UE identifies whether CFRA resources are provided by the gNB and there is at least one SSB/CSI-RS having an SS-RSRP/CSI-RSRP above a threshold among the SSBs/CSI-RSs for which CFRA resources are provided, at operation 311. If CFRA resources are provided by the gNB and there is at least one SSB/CSI-RS having an SS-RSRP/CSI-RSRP above the threshold among the SSBs/CSI-RSs for which CFRA resources are provided, the UE transmits an RA preamble in a PRACH occasion and a MAC PDU in a PUSCH occasion using the assigned CFRA resources, at operation 312. Otherwise, the UE transmits the RA preamble in the PRACH occasion and the MAC PDU in the PUSCH occasion using the CBRA resources, at operation 313. In an embodiment, it is possible that a valid PUSCH occasion is not available corresponding to a selected SSB/CSI-RS, and in this case, the UE skips transmission of the MSGA MAC PDU.

Step 2: The UE then starts a msgB-ResponseWindow and monitors the PDCCH for RAR in the msgB-ResponseWindow, at operation 320. The UE monitors the PDCCH of the SpCell for an RAR identified by an MSGB-RNTI while the msgB-Response Window is running. If a C-RNTI MAC CE was included in the MSGA, then the UE additionally monitors the PDCCH of the SpCell for the RAR identified by the C-RNTI while the msgB-ResponseWindow is running.

Step 3: While msgB-ResponseWindow is running, the UE identifies whether the C-RNTI was included in the MSGA and the UE receives a PDCCH addressed to the C-RNTI and this RA procedure was initiated for BFR, at operation 331.

If the C-RNTI was included in the MSGA, the UE receives the PDCCH addressed to the C-RNTI, and this RA procedure was initiated for BFR, then the UE determines that the RAR reception is successful, at operation 332. The RA procedure is successfully completed, at operation 333. Go to step 8.

Otherwise, the UE identifies whether the C-RNTI was included in the MSGA, a TAT associated with a PTAG is running, the UE receives the PDCCH addressed to the C-RNTI, and this PDCCH contains a UL grant for new transmission, at operation 334. If the C-RNTI was included in the MSGA, the TAT associated with the PTAG is running, the UE receives the PDCCH addressed to the C-RNTI, and this PDCCH contains the UL grant for new transmission, then the UE determines that the RAR reception is successful, at operation 335. The RA procedure is successfully completed, at operation 336. The UE releases the 2-step CFRA resources (e.g., RA preamble(s), ROs, PUSCH resources, etc.) configured (if any) for this RA procedure. Release here means that the UE will not use these resources for a subsequent RA procedure. Go to step 8. In an embodiment, a release operation might not be performed in this case, as contention free resources might not be configured for the case where the PTAG is running and the RA is initiated for events other than BFR.

Otherwise, the UE identifies whether the C-RNTI was included in the MSGA, the TAT associated with the PTAG is not running, the UE receives the PDCCH addressed to the C-RNTI, and a DL TB scheduled by this PDCCH includes an absolute timing advanced command MAC CE, at operation 337. If the C-RNTI was included in the MSGA, the TAT associated with the PTAG is not running, the UE receives the PDCCH addressed to the C-RNTI, and the DL TB scheduled by this PDCCH includes the absolute timing advanced command MAC CE, then the UE determines that the RAR reception is successful, at operation 335. The RA procedure is successfully completed, at operation 336. The UE releases the 2-step CFRA resources (e.g., RA preamble(s), ROs, PUSCH resources, etc.) configured (if any) for this RA procedure. Go to step 8. Release here means that the UE will not use these resources for a subsequent RA procedure.

Otherwise, the UE identifies whether the UE receives the PDCCH addressed to the MSGB-RNTI and a decoded TB includes a fallbackRAR MAC subPDU corresponding to the UE's transmitted preamble, at operation 338. If the UE receives the PDCCH addressed to the MSGB-RNTI and the decoded TB includes the fallbackRAR MAC subPDU corresponding to its transmitted preamble, then the UE determines that the RAR reception is successful, at operation 339.

The UE identifies whether the UE has transmitted a CFRA preamble, at operation 340. If the RA preamble transmitted is the CFRA preamble, then the RA procedure is successfully completed, at operation 341. The UE releases the 2-step CFRA resources (e.g., RA preamble(s), ROs, PUSCH resources, etc.) configured (if any) for this RA procedure. Go to step 8. Release here means that the UE will not use these resources for a subsequent RA procedure.

Otherwise, the UE transmits the MSGA MAC PDU as Msg3 in a UL grant received in a fallbackRAR, at operation 342. The UE starts a contention resolution timer, at operation 343. Go to step 5.

Otherwise, the UE identifies whether the UE receives a PDCCH addressed to the MSGB-RNTI and the decoded TB includes the successRAR MAC subPDU corresponding to the UE's contention resolution identity, at operation 344. If the UE receives the PDCCH addressed to the MSGB-RNTI and the decoded TB includes the successRAR MAC subPDU corresponding to the UE's contention resolution identity (i.e., the contention resolution identity received matches the first 48 bits of a CCCH SDU transmitted in the MSGA), then the UE determines that the RAR reception is successful, at operation 345. The RA procedure is successfully completed, at operation 346. Go to step 8. Note that this is the case when the CCCH SDU is included in the MSGA, and the UE is idle/inactive or performing the RRC connection re-establishment. For these cases, contention free resources are not configured, so there is no need to release. In an alternate embodiment, the UE releases the 2-step CFRA resources (e.g., RA preamble(s), ROs, PUSCH resources, etc.) configured (if any) for this RA procedure. Release here means that the UE will not use these resources for a subsequent RA procedure.

Step 4: The UE identifies whether an RAR window (i.e., msgB-ResponseWindow) expires, at operation 351. If the RAR window (i.e., msgB-ResponseWindow) expires, then the UE increments a preamble transmission counter (PREAMBLE_TRANSMISSION_COUNTER) by 1, at operation 352.

The UE identifies whether a last MSGA was transmitted using contention based resources, at operation 353. If the last MSGA was transmitted using contention based resources, the UE increments the PREAMBLE_TRANSMISSION_COUNTER_CB by 1, at operation 354.

The UE identifies whether the msgATransMax is configured and the PREAMBLE_TRANSMISSION_COUNTER_CB=msgATransMax+1, at operation 355. If msgATransMax is configured, and if the PREAMBLE_TRANSMISSION_COUNTER_CB=msgATransMax+1, then the UE releases 2-step CFRA resources, i.e., preambles/ROs/PUSCH resources configured (if any) for this RA procedure, at operation 356. Release here means that the UE will not use these resources for remaining RA attempts of this RA procedure, and will also not use these resources for a subsequent RA procedure. The UE switches to 4-step RA. Go to step 7. Otherwise, the method returns to the beginning, i.e., go step 1.

Step 5: While the contention resolution timer is running, the UE identifies whether contention resolution is successful, at operation 360.

If the RA procedure was initiated for BFR and the UE receives a PDCCH transmission addressed to the C-RNTI, the RA procedure was initiated by a PDCCH order and the UE receives the PDCCH transmission addressed to the C-RNTI, or the RA procedure was initiated by the MAC sublayer itself or by the RRC sublayer and the UE receives the PDCCH transmission addressed to the C-RNTI and contains a UL grant for a new transmission, then the UE determines that contention resolution is successful, and the RA procedure is successfully completed, at operation 341. The UE releases 2-step CFRA resources, i.e., preambles/ROs/PUSCH resources configured (if any) for this RA procedure. Go to step 8. Release here means that the UE will not use these resources for a subsequent RA procedure.

Step 6: If the contention resolution timer expires at operation 370, then the UE increments the preamble transmission counter by 1, at operation 352.

The UE identifies whether a last MSGA was transmitted using contention based resources, at operation 353. If the last MSGA was transmitted using contention based resources, the UE increments the PREAMBLE_TRANSMISSION_COUNTER_CB by 1, at operation 354.

The UE identifies whether a msgATransMax is configured and PREAMBLE_TRANSMISSION_COUNTER_CB=msgATransMax+1, at operation 355. If msgATransMax is configured, and if PREAMBLE_TRANSMISSION_COUNTER_CB=msgATransMax+1, then the UE releases 2-step CFRA resources, i.e., preambles/ROs/PUSCH resources configured (if any) for this RA procedure at operation 356. Release here means that the UE will not use these resources for remaining RA attempts of this RA procedure, and will also not use these resources for a subsequent RA procedure. The UE switches to 4-step RA. Go to step 7. Otherwise, the method returns to the beginning, i.e., go to step 1.

Step 7: The UE performs 4-step RA. If 4-step CFRA resources are configured, these will be released when the RA procedure is completed.

Step 8: Stop.

A key point of this method is that during a 2-step RA procedure, if MSGA has already been transmitted using contention based resources 'N' times and the RA procedure is not completed, the UE switches to 4-step RA.

Method 5:

Step 0: During the RA procedure initialization, the UE first selects the carrier (the SUL or the NUL). If the carrier to use for the RA procedure is explicitly signaled by the gNB, the UE selects the signaled carrier for performing the RA procedure. If the carrier to use for the RA procedure is not explicitly signaled, the serving cell for the RA procedure is configured with the SUL, and the RSRP of the DL pathloss reference is less than rsrp-ThresholdSSB-SUL, then UE selects the SUL carrier for performing the RA procedure. Otherwise, the UE selects the NUL carrier for performing the RA procedure.

Upon selecting the UL carrier, the UE determines the UL and DL BWP for the RA procedure as specified in section 5.15 of TS 38.321.

The UE then determines whether to perform 2-step or 4-step RA for this RA procedure.

If this RA procedure is initiated by a PDCCH order and if the ra-PreambleIndex explicitly provided by PDCCH is not 0b000000, the UE selects 4-step RA.

Otherwise, if 2-step CFRA resources are signaled by the gNB for this RA procedure, the UE selects 2-step RA.

Otherwise, if 4-step CFRA resources are signaled by the gNB for this RA procedure, the UE selects 4-step RA.

Otherwise, if the UL BWP selected for this RA procedure is configured with only 2-step RA resources, the UE selects 2-step RA.

Otherwise, if the UL BWP selected for this RA procedure is configured with only 4-step RA resources, the UE selects 4-step RA.

Otherwise, if the UL BWP selected for this RA procedure is configured with both 2-step and 4-step RA resources and an RSRP of the DL pathloss reference is below a configured threshold, the UE selects 4-step RA. Otherwise, the UE selects 2-step RA.

The UL carrier for the RA procedure is explicitly signaled by the gNB during handover or reconfiguration with synchronization for 4-step RA. If the gNB wants the UE to select the NUL for 4-step RA, the gNB provides 4-step CFRA resources for the NUL in a reconfiguration message. If the gNB wants the UE to select the SUL for 4-step RA, the gNB provides 4-step CFRA resources for the SUL in the reconfiguration message. In an embodiment, the UL carrier for 2-step RA procedure is also explicitly signaled by the gNB during handover or reconfiguration with synchronization. If the gNB wants the UE to select the NUL for 2-step RA, the gNB provides 2-step CFRA resources for the NUL in reconfiguration message. If the gNB wants the UE to select the SUL for 2-step RA, the gNB provides 2-step CFRA resources for the SUL in reconfiguration message.

If 2-step CFRA resources for the SUL are signaled by the gNB during handover or reconfiguration with synchronization, the UE selects the SUL and the RA type selected is 2-step RA. If 2-step CFRA resources for the NUL are signaled by the gNB during handover or reconfiguration with synchronization, the UE selects the NUL and the RA type selected is 2-step RA. If 4-step CFRA resources for the SUL are signaled by the gNB during handover or reconfiguration with synchronization, the UE selects the SUL and the RA type selected is 4-step RA. If 4-step CFRA resources for the NUL are signaled by the gNB during handover or reconfiguration with synchronization, the UE selects the NUL and the RA type selected is 4-step RA.

Based on the above criteria, the UE has selected a 2-step RA procedure. The UE initializes the preamble transmission counter (PREAMBLE_TRANSMISSION_COUNTER) to zero.

Step 1: If CFRA resources are provided by the gNB and there is at least one SSB/CSI-RS having an SS-RSRP/CSI-RSRP above a threshold among the SSBs/CSI-RSs for which CFRA resources are provided, then the UE transmits an RA preamble in a PRACH occasion using the assigned CFRA resources. If msgATransMax is not configured, or if PREAMBLE_TRANSMISSION_COUNTER is not equal to msgATransMax+1, then the UE transmits the MAC PDU in the PUSCH occasion using the assigned CFRA resources.

Otherwise, the UE transmits the RA preamble in the PRACH occasion using the CBRA resources. If msgATransMax is not configured, or if PREAMBLE_TRANSMISSION_COUNTER is not equal to msgATransMax+1, then the UE transmits the MAC PDU in the PUSCH occasion using the CBRA resources.

A key point is that if PREAMBLE_TRANSMISSION_COUNTER is equal to msgATransMax+1, the UE does not transmit the MSGA MAC PDU irrespective of whether contention based or contention free 2-step RA resources are selected. In an alternate embodiment, if PREAMBLE_TRANSMISSION_COUNTER is equal to msgATransMax+1, the UE does not transmit the MSGA MAC PDU if contention based 2-step RA resources are selected.

Step 2: The UE then starts a msgB-ResponseWindow and monitors the PDCCH for RAR in the msgB-ResponseWindow. The UE monitors the PDCCH of the SpCell for an RAR identified by an MSGB-RNTI while the msgB-Response Window is running. If a C-RNTI MAC CE was included in the MSGA, then the UE additionally monitors the PDCCH of the SpCell for the RAR identified by the C-RNTI while the msgB-ResponseWindow is running.

Step 3: While msgB-ResponseWindow is running:

If the C-RNTI was included in the MSGA, the UE receives a PDCCH addressed to the C-RNTI, and this RA procedure was initiated for BFR, then the RAR reception is successful. The RA procedure is successfully completed. Go to step 8.

Otherwise, if the C-RNTI was included in the MSGA, a TAT associated with a PTAG is running, the UE receives the PDCCH addressed to the C-RNTI, and this PDCCH contains a UL grant for new transmission, then the RAR reception is successful. The RA procedure is successfully completed. The UE releases the 2-step CFRA resources (e.g., RA preamble(s), ROs, PUSCH resources, etc.) configured (if any) for this RA procedure. Release here means that the UE will not use these resources for a subsequent RA procedure. Go to step 8. In an embodiment, a release operation might not be performed in this case, as contention free resources might not be configured for the case where the PTAG is running and the RA is initiated for events other than BFR.

Otherwise, if the C-RNTI was included in the MSGA, the TAT associated with the PTAG is not running, the UE receives the PDCCH addressed to the C-RNTI, and a DL TB scheduled by this PDCCH includes an absolute timing advanced command MAC CE, then the RAR reception is successful. RA procedure is successfully completed. The UE releases the 2-step CFRA resources (e.g., RA preamble(s), ROs, PUSCH resources, etc.) configured (if any) for this RA procedure. Go to step 8. Release here means that the UE will not use these resources for a subsequent RA procedure.

Otherwise, if the UE receives the PDCCH addressed to the MSGB-RNTI and a decoded TB includes a fallbackRAR MAC subPDU corresponding to the UE's transmitted preamble, then the RAR reception is successful.

If the RA preamble transmitted is CFRA preamble, then the RA procedure is successfully completed. The UE releases the 2-step CFRA resources (e.g., RA preamble(s), ROs, PUSCH resources, etc.) configured (if any) for this RA procedure. Go to step 8. Release here means that the UE will not use these resources for a subsequent RA procedure.

Otherwise, the UE transmits an MSGA MAC PDU as Msg3 in a UL grant received in the fallbackRAR. The UE starts a contention resolution timer. Go to step 5.

Otherwise, if the UE receives the PDCCH addressed to the MSGB-RNTI and the decoded TB includes the successRAR MAC subPDU corresponding to the UE's contention resolution identity (i.e., the contention resolution identity received matches the first 48 bits of a CCCH SDU transmitted in MSGA), then the RAR reception is successful. The RA procedure is successfully completed. Go to step 8. Note that this is the case when the CCCH SDU is included in the MSGA, and the UE is idle/inactive or performing the RRC connection re-establishment. For these cases, contention free resources are not configured, so there is no need to release. In an alternate embodiment, the UE releases the 2-step CFRA resources (e.g., RA preamble(s), ROs, PUSCH resources, etc.) configured (if any) for this RA procedure. Release here means that the UE will not use these resources for a subsequent RA procedure.

Step 4: If an RAR window (i.e., msgB-ResponseWindow) expires, then the UE increments a preamble transmission counter by 1. If msgATransMax is configured, and if PREAMBLE_TRANSMISSION_COUNTER=msgATransMax+1, then the UE identifies whether CFRA resources are configured for this 2-step RA. If CFRA resources are configured for this 2-step RA procedure, then the method returns to the beginning, i.e., go to step 1. Otherwise, the UE switches to 4-step RA. Go to step 7. Otherwise, the method returns to the beginning, i.e., go to step 1.

Step 5: While contention resolution timer is running:

If the RA procedure was initiated for BFR and the UE receives the PDCCH transmission addressed to the C-RNTI, the RA procedure was initiated by a PDCCH order and the UE receives the PDCCH transmission addressed to the C-RNTI, or the RA procedure was initiated by the MAC sublayer itself or by the RRC sublayer and the UE receives the PDCCH transmission addressed to the C-RNTI and contains a UL grant for a new transmission, then contention resolution is successful, and the RA procedure is successfully completed. The UE releases 2-step CFRA resources, i.e., preambles/ROs/PUSCH resources configured (if any) for this RA procedure. Go to step 8. Release here means that the UE will not use these resources for a subsequent RA procedure.

Step 6: If the contention resolution timer expires, then the UE increments a preamble transmission counter by 1. If msgATransMax is configured, and if PREAMBLE_TRANSMISSION_COUNTER=msgATransMax+1, then the UE identifies whether CFRA resources are configured for this 2-step RA procedure. If CFRA resources are configured for this 2-step RA procedure, the method returns to the beginning, i.e., go to step 1. Otherwise, the UE switches to 4-step RA. Go to step 7.

Otherwise, the method returns to the beginning, i.e., go to step 1.

Step 7: The UE performs 4-step RA. If 4-step CFRA resources are configured, these will be released when the RA procedure is completed.

Step 8: Stop.

Method 6:

In this method of the disclosure, two configurations of parameter 'msgATransMax' are introduced. During the two step RA procedure, upon expiration of an msgB-response window or a contention resolution timer, if PREAMBLE_TRANSMISSION_COUNTER=msgATransMax+1, the UE switches to 4-step RA.

First configuration of parameter msgATransMax includes that msgATransMax is configured in a BWP configuration of uplink (UL) BWP which supports 2-step RA. The BWP configuration is signaled by the gNB in an RRCReconfiguration message or system information. This parameter is optionally included in 2-step RA common configuration of the UL BWP. The BWP-UplinkCommon information element (IE) of the UL BWP includes rach-ConfigCommonTwoStepRA, and rach-ConfigCommonTwoStepRA includes the parameter msgATransMax. Depending on network implementation, the parameter msgATransMax may be included in zero, one, multiple, or all UL BWPs supporting 2-step RA. Note that if a UL BWP supports 2-step RA, a BWP-UplinkCommon IE of that UL BWP includes rach-ConfigCommonTwoStepRA.

Second configuration of parameter msgATransMax includes that msgATransMax is configured optionally in RACH-ConfigDedicated. The IE RACH-ConfigDedicated is used to specify the dedicated RA parameters. An RRC reconfiguration message includes ReconfigurationWithSync IE, and ReconfigurationWithSync IE includes RACH-ConfigDedicated. The UE applies the parameters received in RACH-ConfigDedicated during reconfiguration with synchronization (e.g., handover) during RA for reconfiguration with synchronization. The parameter msgATransMax configured in RACH-ConfigDedicated is used when the UE performs RA in a first active UL BWP of a target SpCell upon receiving an RRC reconfiguration message with reconfiguration with synchronization.

UE operation includes that the UE receives from the network (i.e., a BS) an RRC reconfiguration message including reconfiguration with synchronization IE (e.g., for handover) for a cell group.

For the first RA procedure in a corresponding SpCell (i.e., an SpCell of a cell group for which reconfiguration with synchronization is received), the reconfiguration with sync IE includes RACH-ConfigDedicated IE. If this RA procedure is based on 2-step RA, during the RA procedure, the UE uses the second configuration of msgATransMax, if configured (i.e., if msgATransMax is included in RACH-ConfigDedicated IE). Otherwise (i.e., if msgATransMax is not included in RACH-ConfigDedicated IE), the UE assumes that msgATransMax is not configured for this RA procedure, i.e., msgATransMax is not applied for this RA procedure In an alternate embodiment, for the first RA procedure in a corresponding SpCell (i.e., an SpCell of a cell group for which reconfiguration with synchronization is received), if this RA procedure is based on 2-step RA, during the RA procedure, the UE uses the second configuration of msgATransMax, if configured (i.e., if msgATransMax is included in RACH-ConfigDedicated IE). If second configuration of msgATransMax is not available (e.g., if RACH-ConfigDedicated IE is not included in reconfiguration with sync IE of received RRC reconfiguration message or if msgATransMax is not included in RACH-ConfigDedicated IE), the UE uses the first configuration of msgATransMax, i.e., from the rach-ConfigCommonTwoStepRA of the BWP selected for this RA procedure, if available. Otherwise, the UE assumes that msgATransMax is not configured for this RA procedure.

For the subsequent RA procedure in the corresponding SpCell, the UE uses the first configuration of msgATransMax, i.e., from the rach-ConfigCommonTwoStepRA of the UL BWP selected for that RA procedure.

UE operation (detailed): the UE receives from the network (i.e., the BS) an RRC reconfiguration message including reconfiguration with synchronization (e.g., for handover) for a cell group. The UE starts the timer T304 for the corresponding SpCell. The UE synchronizes to the DL of the target SpCell. The UE acquires the MIB of the target SpCell, if needed. The UE initiates RA on the target SpCell.

The UE selects the UL carrier (the SUL or the NUL), as explained above. The UE selects the UL and DL BWP for the RA procedure, as explained above. The UE selects the RA type for the RA procedure, as explained above. If this RA procedure is based on 2-step RA procedure and the UL BWP selected is the first active UL BWP, then during this RA procedure, the UE uses the second configuration (i.e., from RACH-ConfigDedicated for corresponding cell group) of msgATransMax, if configured (i.e., if msgATransMax is included in a RACH-ConfigDedicated IE). Otherwise (i.e., if msgATransMax is not included in the RACH-ConfigDedicated IE), the UE assumes that msgATransMax is not configured (i.e., not applied) for this RA procedure. In an embodiment, if the RACH-ConfigDedicated IE is not included in a reconfiguration with sync IE, or if msgATransMax is not included in an RACH-ConfigDedicated IE, the UE uses the first configuration of msgATransMax, i.e., from the rach-ConfigCommonTwoStepRA of the BWP selected for this random access procedure, if available. Otherwise, the UE assumes that msgATransMax is not configured for this random access procedure. The UE uses the parameter msgATransMax for switching to 4-step RA procedure as explained above (methods and background).

Upon successful completion of this RA procedure, T304 is stopped.

Later the UE or the network initiates RA on the SpCell again (e.g., for SR request or BFR, etc. as explained above). The UE selects the UL carrier (the SUL or the NUL), as explained above. The UE selects the UL and DL BWP for the RA procedure, as explained above. The UE selects the RA type for the RA procedure, as explained above. If this RA procedure is based on 2-step RA procedure, then during this RA procedure, the UE uses the first configuration (i.e., from rach-ConfigCommonTwoStepRA) of msgATransMax from the BWP configuration of the active UL BWP. The UE uses the parameter msgATransMax for switching to 4-step RA procedure as explained above (methods and background).

Random Access Preamble Group Selection for 2-Step RACH

The UE performs the following operation during the RA resource selection for each RA attempt of an RA procedure, if CFRA resources are not configured for 2-step RA or if CFRA resources are configured but criteria to select CFRA resources are not met.

Embodiment 1

1> if an RA preambles group is not yet selected in this RA procedure:
2> if an RA preambles group B for 2-step RA is configured:
3> if a potential MSGA payload size (i.e., UL data available for transmission plus a MAC header and, where required, MAC CEs) is greater than ra-MsgASizeGroupA and the pathloss is less than PCMAX (of the serving cell performing the RA procedure)−[preambleReceivedTargetPower]−msgA-DeltaPreamble−messagePowerOffsetGroupB; or
3> if the RA procedure was initiated for the CCCH logical channel and the CCCH SDU size plus MAC subheader is greater than ra-MsgASizeGroupA:
4> select the RA preambles group B.
3> else:
4> select the RA preambles group A.
2> else:
3> select the RA preambles group A.
1> else (i.e., the MSGA is being retransmitted):
2> select the same group of RA preambles as used for an RA preamble transmission attempt corresponding to a first transmission of the MSGA using CBRA resources.

Embodiment 1A

1> if an RA preambles group is not yet selected in this RA procedure:
2> if an RA preambles group B for 2-step RA is configured:
3> if a potential MSGA payload size (UL data available for transmission plus a MAC header and, where required, MAC CEs) is greater than ra-MsgASizeGroupA and the pathloss is less than PCMAX (of the serving cell performing the RA procedure)−[preambleReceivedTargetPower]−msgA-DeltaPreamble−messagePowerOffsetGroupB; or 3> if the RA procedure was initiated for the CCCH logical channel and the CCCH SDU size plus MAC subheader is greater than ra-MsgASizeGroupA; or
3> if an MSGA buffer is not empty and a size of an MSGA MAC PDU in the MSGA buffer is greater than ra-MsgASizeGroupA:
4> select the RA preambles group B.
3> else:
4> select the RA preambles group A.
2> else:
3> select the RA preambles group A.
1> else (i.e., MSGA is being retransmitted):
2> select the same group of RA preambles as used for an RA preamble transmission attempt corresponding to a first transmission of the MSGA using CBRA resources.

Embodiment 2

1> if MSGA is not yet transmitted using CBRA resources:
2> if an RA preambles group B for 2-step RA is configured:
3> if a potential MSGA payload size (UL data available for transmission plus MAC header and, where required, MAC CEs) is greater than ra-MsgASizeGroupA and the pathloss is less than PCMAX (of the serving cell performing the RA procedure)−[preambleReceivedTargetPower]−msgA-DeltaPreamble−messagePowerOffsetGroupB; or
3> if the RA procedure was initiated for the CCCH logical channel and the CCCH SDU size plus MAC subheader is greater than ra-MsgASizeGroupA:
4> select the RA preambles group B.
3> else:
4> select the RA preambles group A.
2> else:
3> select the RA preambles group A.
1> else (i.e., MSGA is being retransmitted):
2> select the same group of RA preambles as used for an RA preamble transmission attempt corresponding to a first transmission of the MSGA using CBRA resources.

Embodiment 2A

1> if MSGA is not yet transmitted using CBRA resources:
2> if an RA preambles group B for 2-step RA is configured:
3> if a potential MSGA payload size (UL data available for transmission plus MAC header and, where required, MAC CEs) is greater than ra-MsgASizeGroupA and the pathloss is less than PCMAX (of the serving cell performing the RA procedure)−[preambleReceivedTargetPower]−msgA-DeltaPreamble−messagePowerOffsetGroupB; or
3> if the RA procedure was initiated for the CCCH logical channel and the CCCH SDU size plus MAC subheader is greater than ra-MsgASizeGroupA; or
3> if an MSGA buffer is not empty and a size of an MSGA MAC PDU in the MSGA buffer is greater than ra-MsgASizeGroupA:
4> select the RA preambles group B.
3> else:
4> select the RA preambles group A.
2> else:
3> select the RA preambles group A.
1> else (i.e., MSGA is being retransmitted):
2> select the same group of RA preambles as used for an RA preamble transmission attempt corresponding to the first transmission of the MSGA using CBRA resources.

Embodiment 3

1> if MSGA is not yet transmitted:
2> if an RA preambles group B for 2-step RA is configured:
3> if a potential MSGA payload size (UL data available for transmission plus MAC header and, where required, MAC CEs) is greater than ra-MsgASizeGroupA and the pathloss is less than PCMAX (of the serving cell performing the RA procedure)−[preambleReceivedTargetPower]−msgA-DeltaPreamble−messagePowerOffsetGroupB; or
3> if the RA procedure was initiated for the CCCH logical channel and the CCCH SDU size plus MAC subheader is greater than ra-MsgASizeGroupA:
4> select the RA preambles group B.
3> else:
4> select the RA preambles group A.
2> else:
3> select the RA preambles group A.
1> else (i.e., MSGA is being retransmitted):
2> if the MSGA was transmitted using CBRA resources
3> select the same group of RA preambles as used for an RA preamble transmission attempt corresponding to a first transmission of the MSGA using CBRA resources.
2> else:
3> if an RA preambles group B for 2-step RA is configured and if a size of an MSGA MAC PDU in an MSGA buffer is greater than ra-MsgASizeGroupA:
4> select the RA preambles group B.
3> else:
4> select the RA preambles group A.

Embodiment 3A

1> if MSGA is not yet transmitted:
2> if an RA preambles group B for 2-step RA is configured:
3> if a potential MSGA payload size (UL data available for transmission plus MAC header and, where required, MAC CEs) is greater than ra-MsgASizeGroupA and the pathloss is less than PCMAX (of the serving cell performing the RA procedure)−[preambleReceivedTargetPower]−msgA-DeltaPreamble−messagePowerOffsetGroupB; or
3> if the RA procedure was initiated for the CCCH logical channel and the CCCH SDU size plus MAC subheader is greater than ra-MsgASizeGroupA:
4> select the RA preambles group B.
3> else:
4> select the RA preambles group A.
2> else:
3> select the RA preambles group A.
1> else (i.e., MSGA is being retransmitted):
2> if the RA preambles group B for 2-step RA is configured and if size of an MSGA MAC PDU in an MSGA buffer is greater than ra-MsgASizeGroupA:
3> select the RA preambles group B
2> else:
3> select the RA preambles group A The above change ensures that when the UE switches from 2-step CFRA to 2-step CBRA, the MSGA is not rebuilt.

Figure 4:
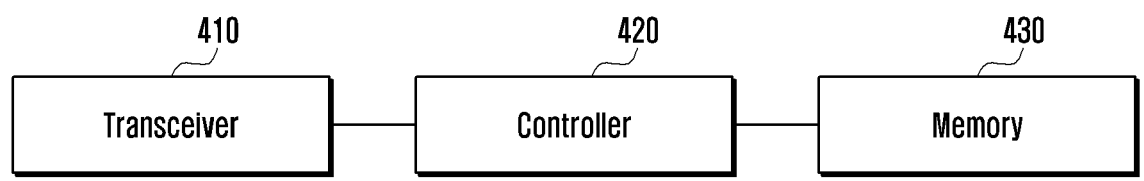
FIG. 4 is a block diagram of a terminal according to an embodiment of the disclosure.

FIG. 4 is a block diagram of a terminal according to an embodiment of the disclosure.

Referring to FIG. 4, a terminal includes a transceiver 410, a controller 420 and a memory 430. The controller 420 may refer to a circuitry, an application-specific integrated circuit (ASIC), a field programmable gate array (FPGA), or at least one processor. The transceiver 410, the controller 420, and the memory 430 are configured to perform the operations of the UE illustrated elsewhere in the figures, e.g., FIGS. 1 to 3, or as otherwise described above. Although the transceiver 410, the controller 420, and the memory 430 are shown as separate entities, they may be integrated onto a single chip. The transceiver 410, the controller 420, and the memory 430 may also be electrically connected to or coupled with each other.

The transceiver 410 may transmit and receive signals to and from other network entities, e.g., a base station.

The controller 420 may control the UE to perform functions according to the embodiments described above. For example, the controller 420 is configured to control to the transceiver 410 an RRC reconfiguration message including dedicated configuration information for an RA to a base station and identify whether first information on a maximum number for MSGA transmissions is configured in the dedicated configuration information. In case that the first information on the maximum number is configured in the dedicated configuration information, the controller 420 is configured to perform the RA procedure based on the first information on the maximum number. The controller 420 is further configured to identify whether the RA procedure is initiated for handover. In case that the RA procedure is initiated for handover, the controller 420 is further configured to perform the RA procedure by identifying whether a number of MSGA transmissions is greater than the maximum number configured in the dedicated configuration information and switching from the 2-step RA to 4-step RA in case that the number of MSGA transmissions is greater than the maximum number configured in the dedicated configuration information. In addition, the controller 420 is further configured to control the transceiver 410 to receive common configuration information for 2-step RA in a UL BWP from the base station and identify whether second information on a maximum number for MSGA transmissions is configured in the common configuration information. In case that the first information on the maximum number is not configured in the dedicated configuration information and the second information on the maximum number is configured in the common configuration information, or in the case that the RA procedure is not initiated for handover and the second information on the maximum number is configured in the common configuration information, the controller 410 is further configured to perform the RA procedure based on the second information on the maximum number.

In an embodiment, the operations of the terminal may be implemented using the memory 430 storing corresponding program codes. Specifically, the terminal may be equipped with the memory 430 to store program codes implementing desired operations. To perform the desired operations, the controller 420 may read and execute the program codes stored in the memory 430 by using a processor or a central processing unit (CPU).

Figure 5:
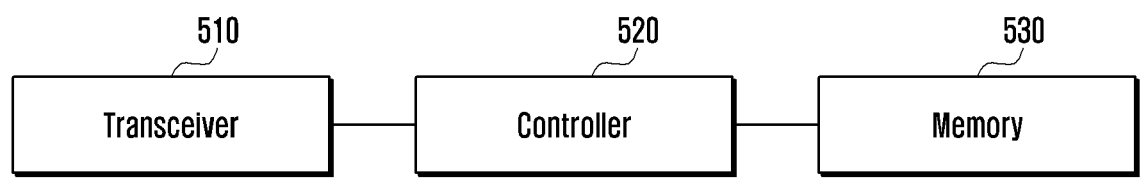
FIG. 5 is a block diagram of a base station according to an embodiment of the disclosure.

FIG. 5 is a block diagram of a base station according to an embodiment of the disclosure.

Referring to FIG. 5, a base station includes a transceiver 510, a controller 520, and a memory 530. The controller 520 may refer to a circuitry, an ASIC, an FPGA, or at least one processor. The transceiver 510, the controller 520, and the memory 530 are configured to perform the operations of the gNB illustrated elsewhere in the figures, e.g., FIGS. 1 to 3, or as otherwise described above. Although the transceiver 510, the controller 520, and the memory 530 are shown as separate entities, they may be integrated onto a single chip. The transceiver 510, the controller 520, and the memory 530 may also be electrically connected to or coupled with each other.

The transceiver 510 may transmit and receive signals to and from other network entities, e.g., a terminal.

The controller 520 may control the gNB to perform functions according to the embodiments described above. For example, the controller 520 is configured to control the transceiver 510 to transmit an RRC reconfiguration message including dedicated configuration information for an RA and perform the RA procedure. First information on a maximum number for MSGA transmissions may be configured in the dedicated configuration information. In addition, the controller 520 is further configured to control the transceiver 510 to transmit common configuration information for 2-step RA in a UL BWP including second information on a maximum number for MSGA transmissions.

In an embodiment, the operations of the base station may be implemented using the memory 530 storing corresponding program codes. Specifically, the base station may be equipped with the memory 530 to store program codes implementing desired operations. To perform the desired operations, the controller 520 may read and execute the program codes stored in the memory 530 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a radio resource control (RRC) message comprising information on a reconfiguration with synchronization, wherein the information on the reconfiguration with synchronization includes information on a dedicated configuration for a two-step random access (RA) procedure;
   identifying whether the information on the dedicated configuration for the two-step RA procedure includes information on a maximum number for message A (MSGA) transmissions;
   performing, on a cell, the two-step RA procedure based on the information on the maximum number for MSGA transmissions included in the information on the dedicated configuration for the two-step RA procedure, in case that the information on the dedicated configuration includes the information on the maximum number for MSGA transmissions; and
   performing, on the cell, the two-step RA procedure based on the information on the maximum number for MSGA transmissions included in information on a common configuration associated with the two-step RA procedure, in case that the information on the dedicated configuration does not include the information on the maximum number for MSGA transmissions.

2. The method of claim 1, wherein the performing of the two-step RA procedure based on the information on the maximum number for MSGA transmissions included in the information on the dedicated configuration includes:
   identifying whether a number of MSGA transmissions associated with the two-step RA procedure reaches a value based on the information on the maximum number for MSGA transmissions included in the information on the dedicated configuration; and switching from the two-step RA procedure to a four-step RA procedure, in case that the number of MSGA transmissions associated with the two-step RA procedure reaches the value based on the information on the maximum number for MSGA transmissions included in the information on the dedicated configuration.

3. The method of claim 1, further comprising:
receiving configuration information on an uplink (UL) bandwidth part (BWP),
wherein the configuration information includes the information on the common configuration
associated with the two-step RA procedure.

4. A method performed by a base station in a wireless communication system, the method comprising:
determining whether to configure information on a maximum number for message A (MSGA) transmissions associated with a two-step random access (RA) procedure in information on a dedicated configuration for the two-step RA procedure;
transmitting, to a terminal, a radio resource control (RRC) message comprising information on a reconfiguration with synchronization, wherein the information on the reconfiguration with synchronization includes the information on the dedicated configuration for the two-step RA procedure;
monitoring, on a cell, a message A (MSGA) for the two-step RA procedure which is transmitted, from the terminal, based on the information on the maximum number for MSGA transmissions included in the information on the dedicated configuration for the two-step RA procedure, in case that the information on the dedicated configuration includes the information on the maximum number for MSGA transmissions; and
monitoring, on the cell, the MSGA for the two-step RA procedure which is transmitted, from the terminal, based on the information on the maximum number for MSGA transmissions included in information on a common configuration associated with the two-step RA procedure, in case that the information on the dedicated configuration does not include the information on the maximum number for MSGA transmissions.

5. The method of claim 4, wherein the information on the maximum number for MSGA transmissions indicates the maximum number of MSGA transmissions associated with the two-step RA procedure before the terminal switches from the two-step RA procedure to a four-step RA procedure.

6. The method of claim 4, further comprising:
transmitting, to the terminal, configuration information on an uplink (UL) bandwidth part (BWP),
wherein the configuration information includes the information on the common configuration associated with the two-step RA procedure.

7. A terminal comprising:
a transceiver; and
a controller configured to:
receive, from a base station via the transceiver, a radio resource control (RRC) message comprising information on a reconfiguration with synchronization, wherein the information on the reconfiguration with synchronization includes information on a dedicated configuration for a two-step random access (RA) procedure,
identify whether the information on the dedicated configuration for the two-step RA procedure includes information on a maximum number for message A (MSGA) transmissions,
perform, on a cell, the two-step RA procedure based on the information on the maximum number for MSGA transmissions included in the information on the dedicated configuration for the two-step RA procedure, in case that the information on the dedicated configuration includes the information on the maximum number for MSGA transmissions, and
perform, on the cell, the two-step RA procedure based on the information on the maximum number for MSGA transmissions included in information on a common configuration associated with the two-step RA procedure, in case that the information on the dedicated configuration does not include the information on the maximum number for MSGA transmissions.

8. The terminal of claim 7, wherein the controller is further configured to:
identify whether a number of MSGA transmissions associated with the two-step RA procedure reaches a value based on the information on the maximum number for MSGA transmissions included in the information on the dedicated configuration, and
switch from the two-step RA procedure to a four-step RA procedure, in case that the number of MSGA transmissions associated with the two-step RA procedure reaches the value based on the first information on the maximum number for MSGA transmissions included in the information on the dedicated configuration.

9. The terminal of claim 7,
wherein the controller is further configured to:
receive, via the transceiver, configuration information on an uplink (UL) bandwidth part (BWP), and
wherein the configuration information includes the information on the common configuration
associated with the two-step RA procedure.

10. A base station comprising:
a transceiver; and
a controller configured to:
determine whether to configure information on a maximum number for message A (MSGA) transmissions associated with a two-step random access IRA) procedure in information on a dedicated configuration for the two-step RA procedure,
transmit, to a terminal via the transceiver, a radio resource control (RRC) message comprising information on a reconfiguration with synchronization, wherein the information on the reconfiguration with synchronization includes the information on the dedicated configuration for the two-step RA procedure,
monitor, on a cell, a MSGA for the two-step RA procedure which is transmitted, from the terminal, based on the information on the maximum number for MSGA transmissions included in the information on the dedicated configuration for the two-step RA procedure, in case that the information on the dedicated configuration includes the information on the maximum number for MSGA transmissions, and
monitor, on the cell, the MSGA for the two-step RA procedure which is transmitted, from the terminal, based on the information on the maximum number for MSGA transmissions included in information on a common configuration associated with the two-step RA procedure, in case that the information on the dedicated configuration does not include the information on the maximum number for MSGA transmissions.

11. The base station of claim 10, wherein the information on the maximum number for MSGA transmissions indicates the maximum number of MSGA transmissions associated with the two-step RA procedure before the terminal switches from the two-step RA procedure to a four-step RA procedure.

12. The base station of claim 10,
wherein the controller is further configured to:
transmit, on the cell via the transceiver, configuration information on a common configuration associated with an uplink (UL) bandwidth part (BWP), and
wherein the configuration information includes the information on the common configuration associated with the two-step RA procedure.

13. The method of claim 1, further comprising:
switching from the two-step RA procedure to a four-step RA procedure using two-step contention free RA (CFRA) resources.

14. The method of claim 1, wherein the performing of the two-step RA procedure based on the information on the maximum number for MSGA transmissions included in the information on the common configuration associated with the two-step RA procedure includes:
identifying whether a number of MSGA transmissions associated with the two-step RA procedure reaches a value based on the information on the maximum number for MSGA transmissions included in the information on the common configuration; and
switching from the two-step RA procedure to a four-step RA procedure, in case that the number of MSGA transmissions associated with the two-step RA procedure reaches the value based on the information on the maximum number for MSGA transmissions included in the information on the common configuration.

15. The method of claim 1,
wherein the cell is identified based on the information on the reconfiguration with synchronization.

\* \* \* \* \*